(12) United States Patent
Tadepalli et al.

(10) Patent No.: US 12,188,450 B2
(45) Date of Patent: Jan. 7, 2025

(54) METHOD AND SYSTEM FOR OPERATING A WIND FARM BY RECONCILING PERFORMANCE AND OPERATIONAL CONSTRAINTS

(71) Applicant: The AES Corporation, Arlington, VA (US)

(72) Inventors: Srikanth Tadepalli, Dayton, OH (US); Sean Otto, Indianapolis, IN (US); Guohua Ren, Indianapolis, IN (US); Tristan Lee, Buffalo Gap, TX (US)

(73) Assignee: The AES Corporation, Arlington, VA (US)

( * ) Notice: Subject to any disclaimer, the term of this patent is extended or adjusted under 35 U.S.C. 154(b) by 0 days.

(21) Appl. No.: 18/228,906

(22) Filed: Aug. 1, 2023

(65) Prior Publication Data

US 2024/0035446 A1    Feb. 1, 2024

Related U.S. Application Data

(60) Provisional application No. 63/394,112, filed on Aug. 1, 2022.

(51) Int. Cl.
*F03D 7/04*    (2006.01)
*F03D 7/02*    (2006.01)

(52) U.S. Cl.
CPC ........... *F03D 7/049* (2023.08); *F03D 7/0204* (2013.01); *F05B 2270/32* (2013.01); *F05B 2270/321* (2013.01); *F05B 2270/329* (2013.01)

(58) Field of Classification Search
None
See application file for complete search history.

(56) References Cited

U.S. PATENT DOCUMENTS

| | | | |
|---|---|---|---|
| 9,551,322 B2 * | 1/2017 | Ambekar | G05B 13/048 |
| 10,260,481 B2 | 4/2019 | Wilson et al. | |
| 10,428,796 B2 | 10/2019 | Lee | |

(Continued)

FOREIGN PATENT DOCUMENTS

| | | |
|---|---|---|
| EP | 3037657 A1 | 6/2016 |
| EP | 3862562 A1 | 8/2021 |
| WO | 2021121510 A1 | 6/2021 |

OTHER PUBLICATIONS

Sun Jili et al (Multi-Objective Offshore Wind Farm Wake Redirection Optimization for Power Maximization and Load Reduction—2022 American Control Conference—Jun. 8-10, 2022) (Year: 2022).*

(Continued)

*Primary Examiner* — Juan G Flores
(74) *Attorney, Agent, or Firm* — Lempia Summerfield Katz LLC

(57) ABSTRACT

A method and system for operating a wind farm by reconciling performance and operational constraints is disclosed. A wind farm may be subject to wakes, thereby reducing performance In order to lessen the effects of wakes, wake steering of the wind turbines may be performed. Specifically, both an operationally-independent analysis (such as by using a computational fluid dynamic model) and an operationally-dependent analysis may be performed, and the outputs of each analysis may be reconciled in order to determine whether (and how much) to wake steer.

28 Claims, 13 Drawing Sheets

(56) References Cited

U.S. PATENT DOCUMENTS

| | | | |
|---|---|---|---|
| 10,605,228 | B2 | 3/2020 | Evans et al. |
| 10,612,519 | B2 | 4/2020 | Franke et al. |
| 10,815,972 | B2 | 10/2020 | Evans et al. |
| 11,208,986 | B2 | 12/2021 | Zen et al. |
| 11,725,625 | B2 * | 8/2023 | King ............ F03D 7/048 700/287 |
| 2013/0300115 | A1 | 11/2013 | Seem et al. |
| 2015/0308416 | A1 * | 10/2015 | Ambekar ......... F03D 7/045 700/287 |
| 2017/0284368 | A1 | 10/2017 | Franke et al. |
| 2019/0370418 | A1 | 12/2019 | Zeng et al. |
| 2021/0246875 | A1 | 8/2021 | Fu et al. |
| 2021/0310461 | A1 * | 10/2021 | King ............ G05B 13/027 |
| 2021/0340955 | A1 | 11/2021 | Zhang et al. |
| 2021/0363969 | A1 | 11/2021 | Egedal et al. |
| 2022/0069770 | A1 | 3/2022 | Shelton et al. |

OTHER PUBLICATIONS

Adedipe, Tosin, Mahmood Shafiee, and Enrico Zio. "Bayesian network modelling for the wind energy industry: An overview." Reliability Engineering & System Safety 202 (2020): 107053.

Ashwin Renganathan, S., et al. "Data-driven wind turbine wake modeling via probabilistic machine learning." Neural Computing and Applications (2022): 1-16.

Göçmen, Tuhfe, and Gregor Giebel. "Data-driven wake modelling for reduced uncertainties in short-term possible power estimation." Journal of physics: conference series. vol. 1037. No. 7. IOP Publishing, 2018.

Moriarty, Patrick, Nicholas Hamilton, Mithu Debnath, et al. 2020. American WAKE experiment-AWAKEN. Golden, CO: National Renewable Energy Laboratory.NREL/TP-5000-75789. https://www.nrel.gov/docs/fy20osti/75789.pdf.

Simley, Eric, et al. "Wake steering wind farm control with preview wind direction information." 2021 American Control Conference (ACC). IEEE, 2021.

U.S. Department of Energy Office of Energy Efficiency & Renewable Energy. "The American WAKE experimeNt (AWAKEN)." www.energy.gov, Jan. 2022, www.energy.gov/sites/default/files/2022-01/AWAKEN-fact-sheet.pdf. Accessed Jul. 31, 2023.

Van Beek, Maarten T., Axelle Viré, and Søren J. Andersen. "Sensitivity and uncertainty of the floris model applied on the lillgrund wind farm." Energies 14.5 (2021): 1293.

"AWAKEN: The American WAKE experimeNt." Wind Research | NREL, 2020. www.nrel.gov/wind/awaken.html.

"Reducing Wind Turbine Wakes Could Save Wind Farms Millions." News | NREL, Jan. 2022. www.nrel.gov/news/program/2022/reducing-wind-turbine-wakes.html.

Thomas, Jared J., Pieter MO Gebraad, and Andrew Ning. "Improving the FLORIS wind plant model for compatibility with gradient-based optimization." Wind Engineering 41.5 (2017): 313-329.

International Search Report and Written Opinion for International Application mailed on Nov. 28, 2023.

Sun, Jili, et al. "Multi-Objective Offshore Wind Farm Wake Redirection Optimization for Power Maximization and Load Reduction." 2022 American Control Conference (ACC). IEEE, 2022. (pp. 5235-5240).

Van Dijk, Mike T., et al. "Wind farm multi-objective wake redirection for optimizing power production and loads." Energy 121 (2017): 561-569. (pp. 561-569).

Zhao, Rongyong, et al. "Multi-agent model for fatigue control in large offshore wind farm." 2008 International Conference on Computational Intelligence and Security. vol. 1. IEEE, 2008. (pp. 71-75).

* cited by examiner

METHOD AND SYSTEM FOR OPERATING A WIND FARM BY RECONCILING PERFORMANCE AND OPERATIONAL CONSTRAINTS

REFERENCE TO RELATED APPLICATION

The present application claims priority to U.S. Provisional Application No. 63/394,112, which is incorporated by reference herein in its entirety.

FIELD OF THE INVENTION

The present application relates generally to the field of managing and operating a wind farm. Specifically, the disclosure relates to a methodology for reconciling performance constraints as indicated by a computational fluid dynamic model and operational constraints as indicated by a probabilistic network.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Wind farms may experience significant efficiency losses due to the aerodynamic interaction between turbines. One possible control technique to reduce or minimize these losses is yaw-based wake steering. In particular, computational fluid dynamic (CFD) models may be used to determine optimal wake steering operations of a wind farm in order to reduce the efficiency losses. One example of a CFD model is a FLOw Redirection and Induction in Steady-state (FLORIS) model, which is configured to determine the recommended optimal control settings for the wind farm and analyze across wind rose to estimate the annual energy production (AEP). Specifically, the FLORIS model may comprise a parametric wind turbine wake model configured to predict steady state wake characteristics based on wind turbine position and yaw angle for optimization of control settings and turbine locations.

SUMMARY OF THE INVENTION

In one or some embodiments, a computer-implemented method for wake steering of wind turbines in a wind farm is disclosed. The method includes: automatically sensing one or more aspects of wind; automatically generating, using at least one model configured to analyze both operational state and operational health of one or more wind turbines in the wind farm, recommended yaw control for the one or more wind turbines in order to increase power generated by the one or more wind turbines; and controlling, using the recommended yaw control, the wind farm for wake steering.

In one or some embodiments, a turbine management system is disclosed. The turbine management system includes: a communication interface configured to receive sensed information indicative of one or more aspects of wind; and a wake steering system in communication with the communication interface. The wake steering system is configured to: generate, using at least one model configured to analyze both operational state and operational health of one or more wind turbines in a wind farm, recommended yaw control for the one or more wind turbines in order to increase power generated by the one or more wind turbines; and control, using the recommended yaw control, the wind farm for wake steering.

In one or some embodiments, a computer-implemented method for wake steering of wind turbines in a wind farm is disclosed. The method includes: automatically sensing one or more aspects of wind; automatically generating, using a computational fluid dynamic (CFD) model and based on the one or more aspects of wind, operationally-independent recommended control of at least one of the wind turbines in the wind farm; automatically generating, using a probabilistic network, an operational state of one or more of the wind turbines in the wind farm; automatically reconciling the operationally-independent recommended control and the operational state to generate operationally-dependent recommended control; and controlling, using the operationally-dependent recommended control, the wind farm for wake steering.

In one or some embodiments, a computer-implemented method for wake steering of wind turbines in a wind farm is disclosed. The method includes: automatically sensing one or more aspects of wind; automatically generating, based on the one or more aspects of wind, an operationally-independent list of one or more wind turbines to wake steer; automatically generating an output indicative of an operationally-dependent list of one or more wind turbines to wake steer, the operationally-dependent list being dependent on determinations of one or more of being waked, underperforming, or being derated; automatically analyzing both of the operationally-independent list and the operationally-dependent list; automatically selecting, based on the analysis, one or more wind turbines for wake steering; and controlling the one or more wind turbines for wake steering.

In one or some embodiments, a turbine management system is disclosed. The turbine management system includes: a communication interface configured to receive sensed information indicative of one or more aspects of wind; and a wake steering system in communication with the communication interface. The wake steering system is configured to: automatically generate, using a computational fluid dynamic (CFD) model and based on the one or more aspects of the wind, operationally-independent recommended control of one or more wind turbines in a wind farm; automatically generate, using a probabilistic network, an operational state of a plurality of the wind turbines in the wind farm; automatically reconcile the operationally-independent recommended control and the operational state to generate operationally-dependent recommended control; and control, using the operationally-dependent recommended control, the wind farm for wake steering.

In one or some embodiments, a turbine management system is disclosed. The turbine management system includes: a communication interface configured to receive sensed information indicative of one or more aspects of wind; and a wake steering system in communication with the communication interface. The wake steering system is configured to: automatically generate, based on the one or more aspects of the wind, an operationally-independent list of one or more wind turbines to wake steer; automatically generate an output indicative of an operationally-dependent list of one or more wind turbines to wake steer, the operationally-dependent list being dependent on determinations of one or more of being waked, underperforming, or being derated; automatically analyze both of the operationally-independent list and the operationally-dependent list; automatically select, based on the analysis, one or more wind turbines for wake steering; and control the one or more wind turbines for wake steering.

In one or some embodiments, a turbine management system is disclosed. The turbine management system includes: a communication interface configured to receive sensed information indicative of one or more aspects of wind; and a wake steering system in communication with the communication interface. The wake steering system is configured to: automatically generate, based on the one or more aspects of the wind, an operationally-independent list of one or more wind turbines to wake steer; automatically generate an output indicative of an operationally-dependent list of one or more wind turbines to wake steer, the operationally-dependent list being dependent on determinations of one or more of being waked, underperforming, or being derated; automatically analyze both of the operationally-independent list and the operationally-dependent list; automatically select, based on the analysis, one or more wind turbines for wake steering; and control the one or more wind turbines for wake steering.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION OF THE INVENTION

Figure 1A:
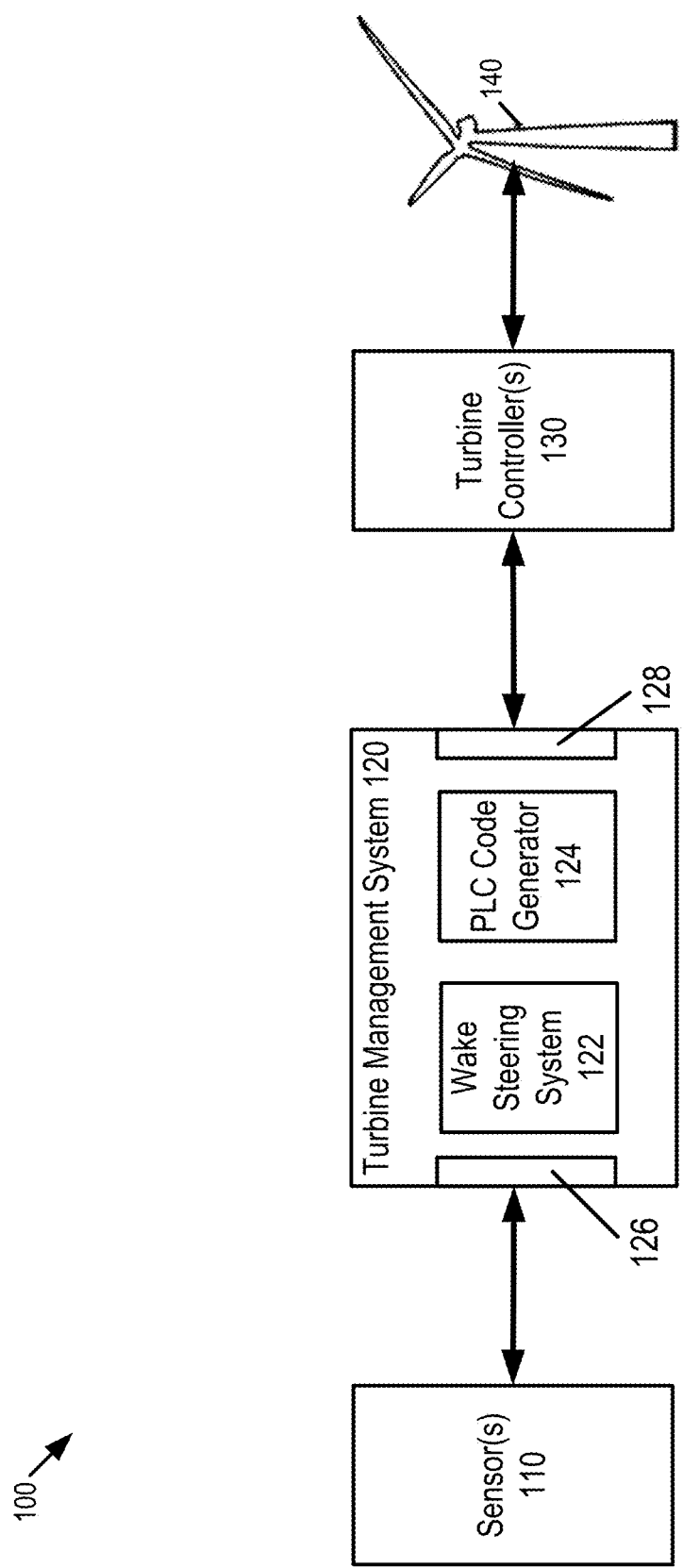
FIG. 1A is a first example block diagram illustrating a high level system architecture for operating wind turbines in connection with one or more wind sensors.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

Generally speaking, there are conflicting requirements in operating a wind farm between maximizing efficiency (e.g., maximizing the output generated by the wind farm) and maximizing the health of the wind turbines. In particular, performance maximization from a wind farm, such as measured in terms of AEP, is much sought after to extract a high return on investment (ROI) value. AEP may be largely dependent on natural uncontrollable occurrences such as any one, any combination, or all of wind speed, wind direction, wind seasonal variations, etc. However, AEP to some extent may also be influenced by controllable parameters such as the wake generated and its management, maintenance and performance coefficient of a turbine and its rating. Wakes generated by upstream turbines may significantly impact the downstream turbines causing reduction in individual turbine and overall farm power.

Further, it may be advisable to factor the operational health of the wind turbines when considering improving or maximizing efficiency (e.g., either due to the current operational health of the wind turbines or due to the effect on the future operational health of the wind turbines due to yaw steering). In particular, the functioning of individual turbines in a wind farm may complicate performance maximization since, at any given point in time, may be any one, any combination, or all of: independent, dependent, and interdependent simultaneously. As one example, a respective turbine's own health may determine the maintenance and operational usage, and hence may be independent in terms of maintenance, repair and overhaul (MRO) activity. As another example, external factors, such as wind speed, may determine deration (discussed further below), and hence may render the respective turbine dependent on the external factors. As yet another example, the existence of a shadow effect (e.g., a wake) may affect the respective turbine's nacelle direction, which is indicative of the interdependence. As still another example, various aspects of yaw steering may negatively affect the health of a turbine, such as when yaw steering the respective wind turbine overly frequently and/or when yaw steering changing the yaw too greatly and/or when changing the yaw to be outside a recommended range. In this regard, analyzing individual turbines for improving or maximizing performance may be very complicated.

Various approaches may be used to steer wake away from downstream turbines. In particular, wake steering may comprise selecting the wind turbines to be turned, and by how much. In one or some embodiments, wake steering may be dependent on one or more models that factor one or both of the operational state and the operational health of the wind turbines at a wind farm in determining the recommended yaw control (e.g., yaw angles) for one or more of the wind turbines at the farm.

Various factors to the operational state and the operational health of the wind turbines are considered. As discussed in more detail below, the factors may comprise any one, any combination, or all of: being waked (e.g., a probability of a respective turbine being waked); being offline (e.g. a probability of the respective turbine going offline); under-performing (e.g., a probability of the respective turbine under-performing); being derated (e.g., a probability of the respective turbine being derated); number of yaw steers in a predetermined time period (e.g., number of yaw steers performed for the respective turbine within a day); extent of yaw angle change (e.g., comparing current yaw angle with suggested yaw angle for the respective turbine); or limit as to yaw angle change (e.g., self-imposed limit that is less than the suggested angles generated by FLORIS). Thus, in one or some embodiments, the factors may be based on both a current sensing of the one or more aspects of the wind and on a current state of the one or more wind turbines.

In this way, the at least one model may balance efficiency of the power generated (e.g., the increase in AEP) with the operational health of the wind turbines. As discussed in more detail below, the balance between efficiency and operational health may be dynamic, based on the at least one model being trained to consider any one, any combination, or all of: the wind (e.g., the currently sensed wind; the expected wind sensed (such as seasonally); the current state of the turbines (e.g., the current operational state of the turbines and/or the current yaw state of the turbines); or the future state of the turbines (e.g., the future operational state of the turbines and/or the future yaw state of the turbines). Further, in one or some embodiments, the at least one model is trained to consider both the efficiency and the operational health of the wind turbines as a group rather than as individual wind turbine elements, as discussed in more detail below. In this regard, the AEP may be markedly increased for the wind farm, such as by upwards of 2%.

Thus, the model(s) may use the one or more of the factors in order to evaluate various permutations of options to yaw the wind turbines in the wind farm. In one or some embodiments, the factor(s) may be used to exclude various permutations of options for consideration. By way of example, in one or some embodiments, a respective turbine that is waked is not considered for yaw steering. Thus, in such an example, permutations of yawing for the respective turbine that is waked are not evaluated. Alternatively, factor(s) may be used, not for exclusion of permutations, but for evaluation. In the given example of whether the respective turbine is waked, in one or some embodiments, permutations associated with the respective turbine (even if potentially waked), may be considered. It is noted that even though yawing a waked turbine may be considered suboptimal, analyzing the permutations of yawing for the waked turbine may still be advisable given: (i) the model(s) may analyze a larger set of permutations to obtain a desired solution; and (ii) the model(s) may better balance efficiency and health of the turbines. In this regard, in one or some embodiments, the factor(s) may be effectively used as hard limits, thereby excluding certain permutations. Alternatively, or in addition, factor(s) may be used as guidelines, thereby not excluding certain permutations, but essentially penalizing a particular permutation as being less desirable. Still alternatively, certain factor(s) may be considered hard limits (e.g., not yawing past 15° even if the turbine is rated to yaw 15°) and other factors may be considered guidelines (e.g., a waked turbine may still be yawed).

Moreover, the model(s) may use one or more methodologies (such as one or more optimization or selection methodologies) in order to evaluate the various permutations. By way of example, multi-armed bandit may be used to analyze the various permutations. In particular, in probability theory and machine learning, the multi-armed bandit problem is a problem in which a fixed limited set of resources may be allocated between competing (e.g., alternative) choices in a way that maximizes their expected gain, when each choice's properties are only partially known at the time of allocation, and may become better understood as time passes or by allocating resources to the choice. This may be seen as a classic reinforcement learning problem that exemplifies the exploration-exploitation tradeoff dilemma (between exploitation of the machine with the highest expected payoff versus exploration to obtain more information about expected payoffs of other machines), in which a gambler at a row of slot machines decides which machines to play, how many times to play each machine, in which order to play the machines, and whether to continue playing a respective machine or try a different machine. As mentioned above, in certain embodiments, the methodology uses the factors not as hard limits for exclusion of permutations but evaluation of them. In such a scenario, multi-armed bandit may be used to evaluate at least some of the permutations.

As discussed above, in one or some embodiments, the methodology may use at least one model. More specifically, the methodology may use a wind performance simulation model and at least one additional model (such as a machine learned model) to determine the recommended optimal control settings for the wind farm. The combination of the wind performance simulation model with the at least one additional model may perform better than using the wind performance simulation model alone, as discussed in more detail below.

An example of a wind performance simulation model is a computational fluid dynamic (CFD) model, such as a FLORIS model, to determine the optimal wake steering operations of a wind farm. However, typical wind performance simulation models, such as the CFD model, are focused on performance optimization to maximize the annual energy production (AEP) to the exclusion of operational constraints. In this regard, using the CFD model alone may be wanting.

Merely by way of example, the CFD model may recommend a set of turbines for yawing, completely divorced from whether one, some, or all of the turbines in the recommended set of turbines are even plausible candidates (from an operational standpoint) even to be yawed. In this regard, in one or some embodiments, the CFD model generates an operationally-independent list of wind turbine(s) for wake steering. However, a respective turbine in the wind farm, which may be on the CFD-generated list, may be in a state that makes its selection for waking either impossible (e.g., due to being offline) or inadvisable (e.g., due to reduced performance). As such, solutions that focus on the CFD model are, in effect, divorced from operational reality. Thus, in one or some embodiments, a methodology is disclosed that considers both the performance as well as the operational reality of the wind farm in controlling one or more wind turbines in a wind farm for wake steering. In particular, the methodology may include: generating performance recommendations (e.g., output by a CFD model such as a FLORIS model); generating operational recommendations as to the state of the turbines in the wind turbine system (e.g., the state of the turbines output from a probabilistic network, discussed further below); reconciling the differences between the performance recommendations and the operational recommendations in order to control the turbines for wake steering; and controlling one or more wind turbines in the wind farm based on the reconciliation, thereby improving or optimizing the operation of the wind farm. In this way, determining whether (and how much) to wake steer may be based on both an operationally-independent analysis and an operationally-dependent analysis. The disclosed methodology may be applied to various types of wind farms, such as on-shore wind farms, offshore wind farms, and/or floating wind farms.

As discussed in more detail below, various methodologies (such as at least one additional model) are used to determine how to reconcile the differences between the performance recommendations and the operational recommendations. The reconciliation may be based on one or more metrics, such as any one, any combination, or all of: (i) a status of one, some, or all of the turbines (e.g., checking whether waking is occurring to determine whether to perform wake steering (determining whether a downstream turbine is waked, and if not, wake steering need not be performed if the factor of waking excludes these permutations); (ii) checking the status of a respective turbine to determine whether to select the respective turbine for wake steering (e.g., in one embodiment, a turbine that is itself waked is not selected as a candidate for wake steering; alternatively, even a waked turbine may be considered for wake steering); (iii) an energy analysis (e.g., based on whether the turbines selected for waking do not result in an AEP loss); (iv) guidelines of the yawing (e.g., yawing less than 2 degrees is not performed); (v) guidelines for the reconciliation (e.g., performing a smallest change to achieve commonality); or (vi) historical operation of the respective turbine (e.g., how many times has the turbine been yawed in a predetermined period, such as in the past day; amount of suggested change in the yaw angle; contemplated yaw angle (e.g., whether the contemplated yaw angle is greater than 15°). For example, under (i), the system is analyzed to determine whether waking is even occurring. If not, in one or some embodiments, for the specific wind turbine being waked, wake steering for the specific wind turbine need not be performed (e.g., one inquiry is determining whether the respective turbine being considered for yawing is itself creating a downstream wake which, by its wake steering, will reduce the downstream wake; if the respective turbine is not creating a downstream wake, yawing of the respective turbine is, in effect, correcting for a problem that does not from an operational standpoint exist). If so, wake steering may be investigated for one or more other metrics (e.g., increase in AEP, least change commonality, etc.) in order to determine whether to wake steer. In this regard, in one embodiment, such as when there is no commonality, wake steering is performed when each of the following is met: smallest incremental change to achieve commonality; gain in AEP; and yawing is performed on a turbine only if the turbine is creating a downstream waking and where the yawing actually reduces the resultant waking. Only when each of these are met, the yaw angles may be determined, such as by interpolation.

Various methods are contemplated to determine the state of the wind turbines in the wind farm. In one or some embodiments, a probabilistic network (such as an evolutionary probabilistic network) may determine the probability of the state(s) of the wind turbines in the wind farm. For example, the probabilistic network may comprise a Bayesian network in order to model the wind turbines in the wind farm. By way of example, a wind farm may be composed of a plurality of wind turbines (interchangeable termed turbines), each of which may be in one of a plurality of potential states. Example states include any one, any combination, or all of: (1) being waked; (2) going offline (e.g., for maintenance or service of a respective turbine); (3) under-performing (e.g., one or more conditions which result in the energy output of a respective turbine being reduced); or (4) being derated (e.g., deliberately restricting operation of a respective turbine, such as responsive to excessive wind speed to reduce damage to the respective turbine). The probabilistic network may generate outputs for one, some, or each of the wind turbines in the wind farm as to the probability (or probabilities) of one, some or each possible state of a respective wind turbine. As such, the outputs as to the state probability(ies) generated by the probabilistic network may in turn be used to determine whether a respective turbine, from an operational standpoint, will be waked (e.g., has a probability greater than a predetermined amount to be waked) and/or is a feasible candidate for yawing (e.g., has a probability lower than a predetermined amount of going offline, under-performing, or being derated). Thus, the probabilistic network may indicate the operational state of one or more of the wind turbines, which may be used to generate an operationally-dependent list of wind turbine(s) for potential wake steering. Thus, the probabilistic network is one example of how to generate the operationally-dependent list of wind turbine(s) for potential wake steering.

In one or some embodiments, the set of turbines output from the CFD model for wake steering is identical to the set of turbines output from the probabilistic network. In such a case, the turbine management system, which may be tasked with one or both of reconciliation of the outputs and generating the PLC codes for the turbine controller(s), may select the output (including the set of turbines to yaw and the amount of yawing) from the CFD model without modification. Typically (although not always), this is not the case. Instead, the output of the CFD model may include at least one turbine that, according to the probabilistic network, has a lower likelihood of being waked and/or is unable or ill-advised to wake steer. As such, the wake steering system (such as the turbine management system) performs the reconciliation of the outputs of the CFD model and the probabilistic network in order to consider both performance and operational constraints (e.g., reconciling of: (A) the turbines to be wake steered; and (B) the amount of wake steering).

Reconciliation of the performance recommendations and the operational recommendations may be performed in one of several ways. In one or some embodiments, a machine learning (ML) model may be used to reconcile the performance recommendations and the operational recommendations in order to generate: (i) a list of turbines to be yawed; and (ii) an amount of yaw for the list of turbines). Alternatively, software other than an machine learned (alternatively termed machine learning) (ML) model, such as an equation-based methodology or a spreadsheet-based methodology, may be used. Further, reconciliation may be segmented into two categories: (i) at least one turbine is common amongst the outputs from the CFD model and the probabilistic network; or (ii) no turbines are common amongst the outputs from the CFD model and the probabilistic network.

In the instance of (i), in one or some embodiments, reconciliation begins with determining which wind turbines to select for wake steering based on different potential sets of wind turbine(s) for wake steering. A first potential set of wind turbine(s) may comprise the wind turbines that are common to both of the outputs from the CFD model and the probabilistic network and the associated AEP for the first potential set. As such, in one or some embodiments, the first potential set may be considered the baseline against which AEPs for other potential sets of wind turbines may be compared. Merely by way of example, a single wind turbine (e.g., wind turbine X) may be common to both of the outputs from the CFD model and the probabilistic network (e.g., the CFD model outputs wind turbines A, B, and X; the probabilistic network outputs wind turbines W, X, Y, and Z). This results in the first potential set of wind turbine(s) including only wind turbine X and having an associated AEP. In one or some embodiments, one or more other potential sets of wind turbines may be considered, each of the one or more other potential sets of wind turbines including at least the turbine(s) common to both of the outputs from the CFD model and the probabilistic network. In the example of the single common wind turbine X, other potential sets of wind turbines for determining the associated AEP may include additional combinations from the probabilistic network of wind turbines W, X, Y, and Z: wind turbine X and wind turbine Y; wind turbine X and wind turbine Z; wind turbine X and wind turbine W; wind turbine X, wind turbine Y, and wind turbine Z; wind turbine X, wind turbine Y, and wind turbine W; etc. In this way, the potential set of wind turbines with the highest AEP may be selected.

In the instance of (ii) where no turbines are common amongst the outputs from the CFD model and the probabilistic network, in one or some embodiments, the wake steering system may modify operation to force one or both of the probabilistic network or the CFD model to generate at least one wind turbine that is common to both. In one or some embodiments, a change is made resulting in a change in the output of the probabilistic network thereby resulting in an intentional modification of the state of one or more of the turbines. As discussed above, the probabilistic network may generate probabilities (e.g., a lower probability of being waked and/or a higher probability from an operational standpoint not to be selected for wake steering), resulting from an operational standpoint for one or more turbines to not be selected as candidates for yawing due to a lower probability of being waked and/or higher probabilities of going offline, under-performing or being derated. The wake steering system may modify the status of a respective wind turbine (which was selected as a candidate for wake steering by the CFD model but not by the probabilistic network), such as by removing the respective wind turbine from the maintenance schedule or considering the respective wind turbine even if under-performing, so that the respective wind turbine may be considered as a candidate for wake steering by the probabilistic network (and in turn be a common wind turbine). In this way, the modification results in an operating decision and further results in at least one common turbine for the outputs of the CFD model and the probabilistic network.

Alternatively, a change is effectively made so that the CFD model considers wind turbines that it otherwise did not consider in its initial evaluation. By way of example, the probabilistic network may select certain wind turbines for wake steering due to a higher probability of being waked (e.g., the associated probability of being waked being higher than a predetermined amount) and/or not select certain wind turbines as available for yawing due to going offline, under-performing or being derated. The wake steering system may, in one or some embodiments, reject the entire recommended output from the CFD model (e.g., by not selecting any of the turbines output by the CFD model for yawing), and instead consider one, some, or all of the turbines that the probabilistic network (through its generated probabilities) considers as candidates for yawing (e.g., consider a respective turbine that has, according to the probabilistic network, a higher probability of waking even though the respective turbine is not recommended by the CFD model for waking). Thus, in one or some embodiments, the wake steering system 122 emphasizes operational constraints (e.g., analyzing the turbines output by the probabilistic network) over performance constraints (e.g., rejecting the turbines output by the CFD model).

In practice, a model (such as the CFD model in simulation mode or another simulation model that may generate an estimated AEP) may determine the AEP for one, some, or all of the turbines that the probabilistic network considers as candidates for yawing, and may select the turbine(s) with the highest AEP. The selection of none of the turbines as output by the CFD model may necessarily result in a lower performance; nevertheless, the selection of the turbines (other than those recommended by the CFD model) may improve operation of the wind farm when faced with potential wakes. In this regard, though the system in certain embodiments may entirely reject the recommendation from the CFD model, the system may still select turbines for wake steering in order to improve overall operation. As such, in one instance, performance may be sacrificed for the operational reality (e.g., rejecting the output from the CFD model by selecting turbines not recommended but able to be yawed). In another instance, operation may be sacrificed for performance (e.g., selecting a turbine that operationally may not be recommended to yaw, such as by delaying maintenance of that selected turbine or selecting a derated turbine).

By way of example, wind turbines 1-7 comprise an illustrative wind farm, with the CFD model selecting wind turbines 2-4 as candidates for wake steering and the probabilistic network selecting wind turbines 5-7 as candidates for wake steering. In the given example, a first approach is to modify the operation, such as removing one or both of wind turbines 2 and 4 from scheduled maintenance, resulting in a forced commonality. In one or some embodiments, in forcing a change, the wake steering system seeks to make the smallest change that results in a match. Thus, in effecting the smallest change, the wake steering system may change the operational status of a single wind turbine (either wind turbine 2 or wind turbine 4, but not both). One or more criteria may be used to determine whether a potential smallest change (e.g., yawing a single turbine) may be acceptable. In one or some embodiments, the criteria may comprise one or both of the resulting AEP (e.g., a significantly lowered AEP results in a potential change being unacceptable) or the yaw angle (e.g., the simulated change for a respective turbine resulting in a recommended yaw angle of less than a predetermined amount, such as 2 degrees, may be rejected since a yaw angle of less than 2 degrees may not potentially result in any measurable impact). Various elements may determine the potential smallest change to force the commonality. For example, in one or some embodiments, to determine which wind turbine status to change, the wake steering system may use a simulation model (e.g., the CFD model in its mode as a simulator or another simulation model with inputs of the wind speed and wind direction) to examine both wind turbines 2 and 4 as candidates for wake steering, and select the wind turbine (whether wind turbine 2 or wind turbine 4) with the higher AEP (as indicated by the CFD model operating in simulator mode or by the simulation model). Alternatively, AEP in combination with the amount of yaw may be used to evaluate the turbines to wake steer. Still alternatively, the ML model may input the disjointed sets of turbines as output from the CFD model and the probabilistic network to determine the smallest change to achieve commonality.

Alternatively, instead of seeking to make the smallest change, the wake steering system may consider changing the status of more than 1 wind turbine in determining which wind turbine(s) to select for wake steering. For example, the system may simulate removing both turbines 2 and 4 from maintenance to determine whether the simulated AEP is higher than the simulations for individual selections of either turbine 2 or turbine 4 and potentially whether the associated yaw angles are greater than 2 degrees.

A second approach is to make a performance decision in which one, some, or all of the wind turbines selected by the probabilistic network are considered for wake steering (e.g., in the given example where the CFD model determines that wind turbines 2-4 are, from a performance standpoint, the candidates for wake steering). In the second approach, none of these wind turbines selected by the CFD model are considered for wake steering, in effect rejecting the optimal performance in order to consider the wind turbines selected by the probabilistic network (e.g., in the given example, only wind turbines 5-7 are considered). In one or some embodiments, the smallest change is sought. For example, simulations (such as by the CFD model in simulation mode using the measured wind speed and wind direction) may estimate the AEP for wake steering each of wind turbines 5, 6 and 7, with the system selecting only one of wind turbines 5, 6, and 7 for wake steering with the highest simulated AEP. Alternatively, more than one turbine may be considered. In the given example, separate from simulating the AEP for wake steering with only one turbine (e.g., simulating the AEP for turbine 5, simulating the AEP for turbine 6, and simulating the AEP for turbine 7), simulations may be performed for combinations of more than one turbine as recommended by the probabilistic network (e.g., simulating the AEP for turbines 5 and 6, simulating the AEP for turbines 5 and 7, simulating the AEP for turbines 6 and 7, simulating the AEP for turbines 5, 6, and 7). In this way, the turbine or combination of turbines with the highest simulated AEP may be selected.

Further, the methodology may update the selection of the turbine(s) for yawing and the yaw angles at predetermined times. Alternatively, or in addition, the updates may be performed dynamically, such as dependent on operational changes. In this regard, the methodology may account for the evolutionary nature of maintenance (e.g., potential changes to operation that may occur every day, every week, etc.).

Moreover, the methodology, including the algorithms or the ML model, may be applied in a variety of contexts. In particular, in one or some embodiments, the algorithm may be applied to a plurality of different wind farms. More specifically, the algorithm may be trained in a first wind farm and thereafter be applied to a second and different wind farm (e.g., with a different layout of wind turbines and/or a different number of wind turbines and/or different type of wind turbines and/or different manufacturer(s) of wind turbines). In this regard, the methodology may be at least partly independent (such as fully independent) of the wind farm selected and/or independent of the turbines selected. In one embodiment, the algorithm, such as the ML model, may be trained at the first site and thereafter be used at a second site unaltered. Alternatively, the algorithm, such as the ML model, may be trained at the first site. Thereafter, the algorithm may be used at a second site as an initial or starting model and tailored to the second site. Thus, the methodology may comprise a theoretical framework in combination with practical operations that may be isolated or separated from the specifics of the physical nature of the wind turbines/wind farms. In particular, the methodology may be used to improve or optimize AEP by reconciling performance and operations across a plurality of different layouts or different numbers of turbines. This is unlike a situational-specific algorithm that is tailored to a particular wind farm. Instead, the knowledge gleaned from one wind farm site may be transferred to another wind farm site.

Further, the methodology may consider one or more different types of wakes. As one example, the methodology may consider wakes generated by the wind farm that is being wake steered (e.g., turbines in the wind farm at issue are creating the wakes). Alternatively, or in addition, the methodology may consider wakes generated by a separate wind farm or wake steering performed by the separate wind farm (whose turbines are not subject to the methodology's control). For example, in a given geographical area, wakes may be created by an external wind farm, which may affect the wind farm subject to control by the methodology. Alternatively, the external wind farm may perform wake steering, which may likewise affect the wind farm subject to control by the methodology. In either instance, given certain information about the external wind farm (e.g., the number of turbines, the makes/modes of the turbines, etc.), the CFD model may determine the wake impact on the wind farm at issue. In this regard, the methodology may consider wakes generated by the wind farm subject to control and/or wakes (or wake steering) caused by a separate wind farm not under its control. This may result in a system with any one, any combination, or all of: a flexibly implemented wake steering system (e.g., the system may choose the setting for wake steering independently of the specifics of the turbines, such as the specific manufacturers of the turbines); a decoupled wake steering system (e.g., the wake steering system operations in similar fashion whether turbulence is caused by a neighboring wind farm or not); or an intelligent wake steering system configured to account for performance and operational constraints.

Referring to the figures, FIG. 1A is a first example block diagram of a system 100 illustrating a high level system architecture for operating wind turbines in connection with one or more wind sensors. The system 100 may include one or more wind turbines 140. The wind turbine(s) 140 may be any type of wind turbine configured to generate electrical power that operates using wind as a power source and may be of any manufacture and configuration without regard for the methods and systems discussed herein. That is to say, the wind turbine(s) 140 need not be of a special manufacture or configuration that is designed to operate in the system 100, but may be any type of wind turbine, such as a legacy wind turbine, and may operate in the system 100 as a result of the methods and systems discussed herein.

The system 100 includes a turbine management system 120, which may include wake steering system 122 (discussed further in FIG. 1B) and programmable logic control (PLC) code generator 124 (which is an example of a command generator). The system 100 may further include one or more turbine controllers 130, which may be part of one or more wind turbines 140 or separate therefrom. Turbine management system 120 may further include a sensor communication interface 126 that is configured to communicate with sensor(s) 110, and turbine controller communication interface 128 that is configured to communicate with turbine controller(s) 130. In one or some embodiments, sensor communication interface 126 and turbine controller communication interface 128 are different interfaces (e.g., communicate via different protocols and/or different wired and/or wireless interfaces). Alternatively, the same communication interface may be used for sensor communication interface 126 and turbine controller communication interface 128.

The turbine controller(s) 130 may be of a type of computing device configured to operate (such as automatically operate) the wind turbine(s) 140. The turbine controller(s) 130 may operate based on one or more wind properties of wind that is local to the wind turbine(s) 140. For example, the turbine controller(s) 130 may operate the wind turbine(s) 140 based on any one, any combination, or all of: wind speed; wind direction; temperature; humidity; barometric pressure; air density; etc. The turbine controller(s) 130 may, for instance, adjust the orientation of the wind turbine(s) 140, resistance of blades of the wind turbine(s) 140, etc. The configuration and operation of turbine controller(s) 130 will be apparent to persons having skill in the relevant art.

Figure 2:
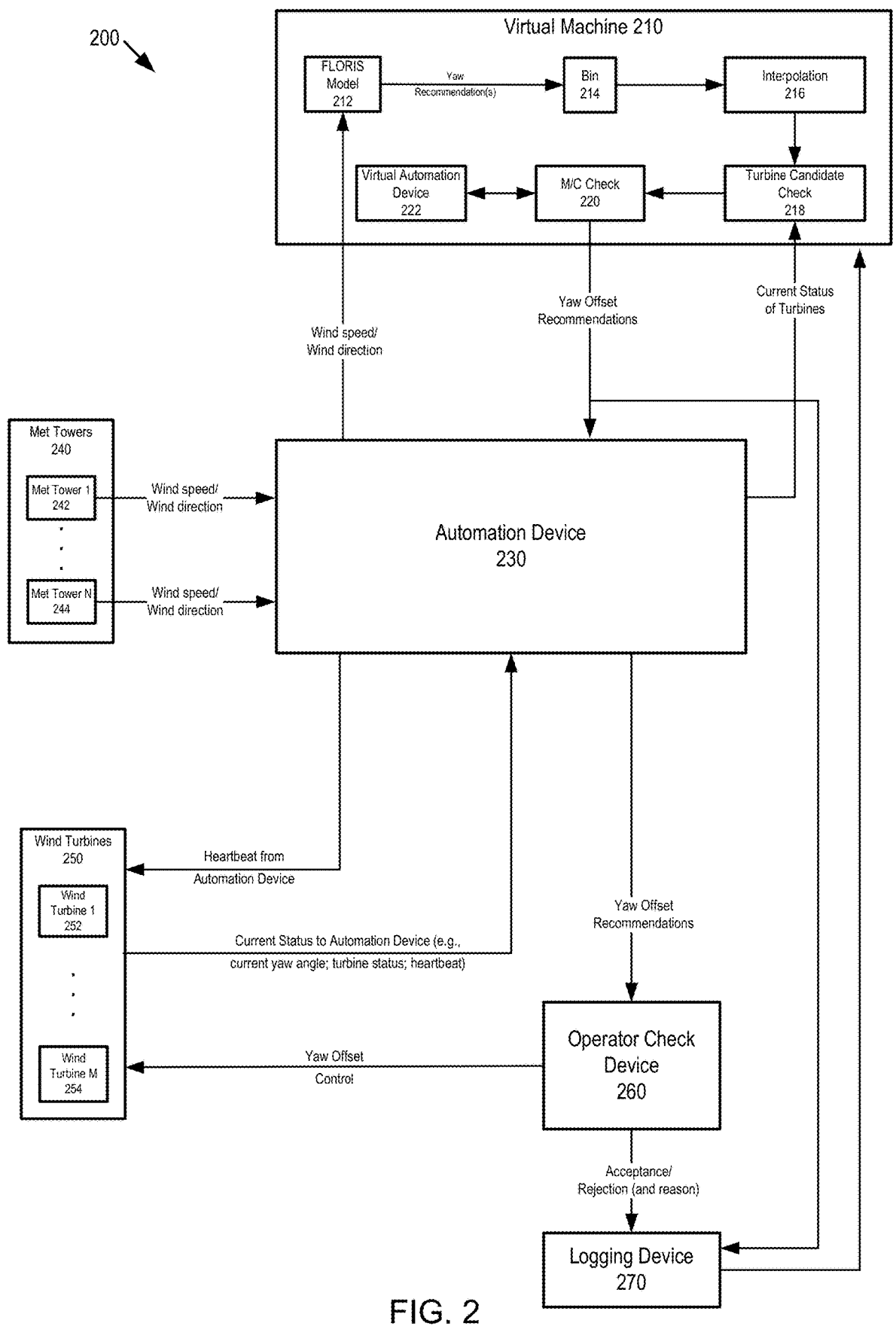
FIG. 2 is a second example block diagram illustrating a high level system architecture for operating wind turbines in connection with one or more wind sensors.

In the system 100, wind properties may be measured via one or more sensors 110, such as an ultrasonic wind sensor (an example of which is discussed further in FIG. 2). In one or some embodiments, the ultrasonic wind sensor may include an even number of ultrasonic transceivers. Each pair of ultrasonic transceivers may be configured to measure one or more wind properties via the use of ultrasonic packets. A first ultrasonic transceiver may transmit an ultrasonic packet to a second ultrasonic transceiver in the ultrasonic wind sensor. Based on a time of receipt of the ultrasonic packet, the ultrasonic wind sensor may calculate one or more wind properties. For example, wind speed may be calculated based on an expected transmission time of an ultrasonic packet (e.g., in the absence of wind) and an actual transmission time of the ultrasonic packet, where delay in the transmission time is a result of wind experienced by the ultrasonic packet.

In one or some embodiments, the ultrasonic wind sensor may include a plurality of pairs of ultrasonic transceivers. In such embodiments, ultrasonic packets may be transmitted between pairs of ultrasonic transceivers, with wind properties calculated by the ultrasonic wind sensor based on the transmission times of the ultrasonic packets transmitted between each of the pairs of ultrasonic transceivers. For example, wind direction may be calculated based on a difference in transmission time between pairs of ultrasonic transceivers and based on the directional orientation of the ultrasonic transceiver pairs. Algorithms used for the calculation of wind properties based on ultrasonic packet transmission times and orientations will be apparent to persons having skill in the relevant art.

Wind properties measured and calculated by the ultrasonic wind sensor may be transmitted to a turbine management system 120 that communicates with sensor(s) 110, such as the ultrasonic wind sensor. In one or some embodiments, the interface may be a physical interface. The PLC code generator 124 may be configured to format one or more commands for transmission to the turbine controller(s) 130, such as yaw steering commands. The PLC code generator 124 may be interfaced with the turbine controller(s) 130 using one or more communication topologies. In one or some embodiments, the interface between the PLC code generator 124 and the turbine controller(s) 130 may be a physical interface. Alternatively, the interface may be wireless. Still alternatively, the communication may be a combination of wired and wireless. The PLC code generator 124 may be configured to format wind properties for transmission to turbine controller(s) 130 using any of the plurality of communication topologies. As a result, the PLC code generator 124, when interfaced between an ultrasonic wind sensor and turbine controller(s) 130, may be configured to provide wind properties to the turbine controller(s) 130 regardless of the manufacture or configuration of the turbine controller(s) 130. Therefore, the PLC code generator 124 may provide for the control of any wind turbine 140 via wind measured using the ultrasonic wind sensor.

Figure 1B:
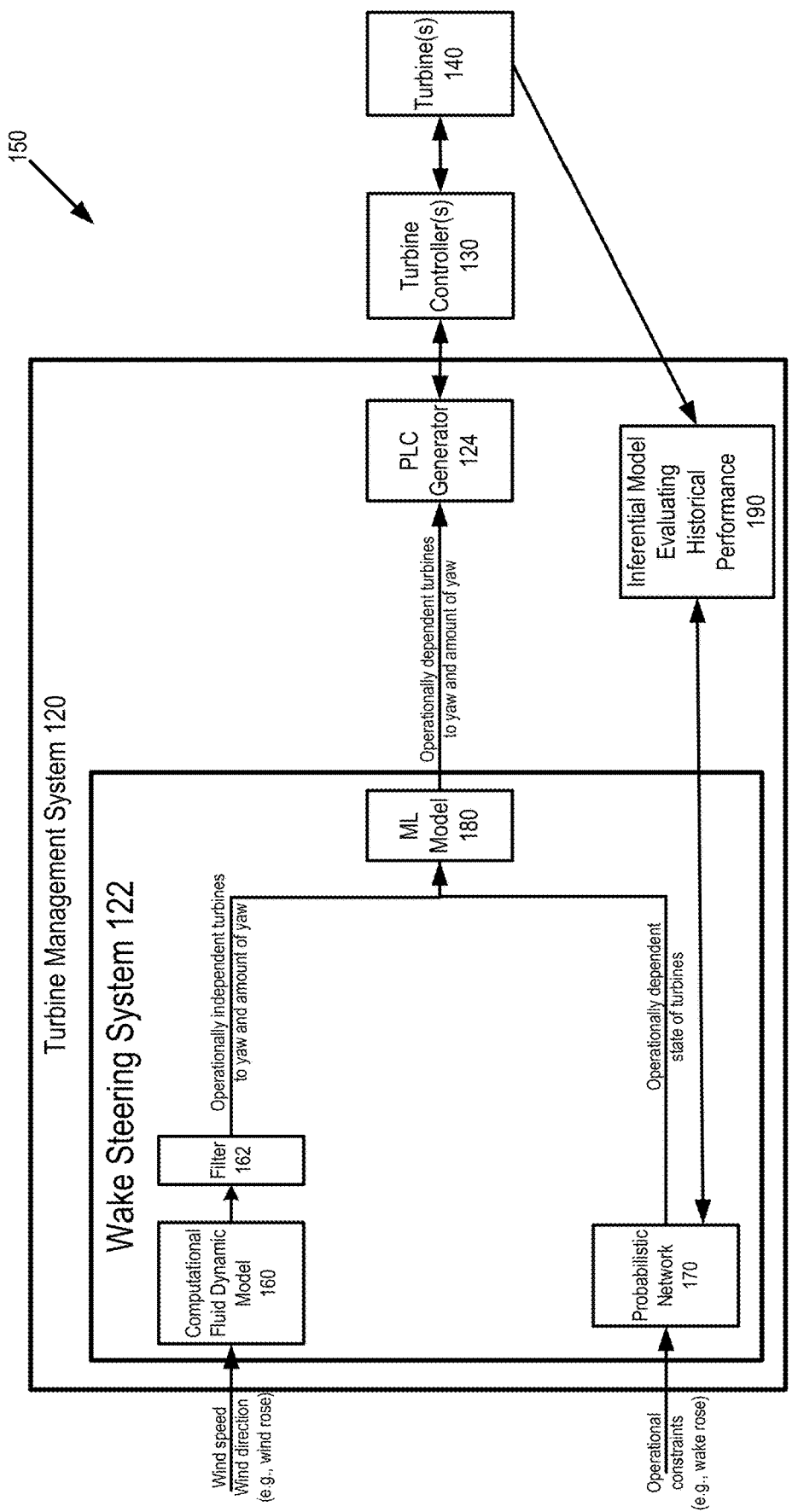
FIG. 1B is an expanded block diagram of the turbine management system illustrated in FIG. 1A.

FIG. 1B is an expanded block diagram 150 of the turbine management system 120 illustrated in FIG. 1A. As discussed above, in one or some embodiments, the wake steering system may include a plurality of models. For example, FIG. 1B depicts wake steering system 122 as including Computational Fluid Dynamic (CFD) model 160, probabilistic network 170, and ML model 180. As discussed in more detail below, the CFD model 160 is configured to generate an operationally-independent recommended control and the probabilistic network 170 is configured to generate an operationally-dependent recommended control.

As shown in FIG. 1B, the CFD model 160 inputs one or both of wind speed and wind direction and output an operationally-independent set or list of turbines to yaw and the amount of yaw. In particular, in one or some embodiments, the CFD model 160 may receive as input a range of the wind speed and a range of the wind direction. In the instance of an input of wind rose (which is a graphic tool to provide a view of how wind speed and wind direction are typically distributed at a particular location), in one or some embodiments, wind roses may use 16 cardinal directions, such as north (N), NNE, NE, etc. Alternatively, wind roses may be subdivided into as many as 32 directions. Regardless, the range for the direction may be input to the CFD model 160. For example, a wind direction may be considered "southerly" as encompassing directions between 180° and 240°. Based on the input, the CFD model 160 may generate an output comprising: (i) the turbine(s) for yawing; and (ii) the amount of yaw for the designated turbines. More specifically, the CFD model 160 may generate a spreadsheet indicating the amount of yaw for the turbines, such as correlated to bins (interchangeably termed buckets) for different wind speeds and wind directions. The bins may be generated in one of several ways. In one way, the bins may be created by the ML model 180 tasked with optimal binning. Further, in one or some embodiments, specific bins may be created for each of wind speed and wind direction. Alternatively, specific bins may be created for both of wind speed and wind direction (e.g., the inputs of both wind speed and wind direction correlate to a single designated bin). As discussed further below, the actual wind speed and/or wind direction (which may be determined by any one, any combination, or all of: a wind vane positioned on the turbine; or a LIDAR system that is positioned on the ground; or met mast) may be used to determine the yaw (e.g., by interpolation).

As discussed above, the CFD model is one example of a wind performance simulation model. Other wind performance simulation models are contemplated. Further, various CFD models are contemplated, one example of which may comprise a FLORIS model. See Gebraad P M, Thomas J J, Ning A, Fleming P A and Dykes K, *Maximization of the annual energy production of wind power plants by optimization of layout and yaw-based wake control*, Wind Energy 20(1): 97-107 (2017); Fleming P, Ning A, Gebraad P and Dykes K, *Wind plant system engineering through optimization of layout and yaw control*, Wind Energy 19: 329-344 (2015), both of which are incorporated by reference herein in their entirety.

Generally speaking, the FLORIS model may input one or both of the wind speed and the wind direction and output a list of turbines to be yawed and the amount of yaw, as discussed above. Further, various types of FLORIS models are contemplated, with the below description being one such example. In one or some embodiments, the FLORIS model may comprise a derivative of the Jensen (or Park) wake model (see Jensen N O, *A note on wind generator interaction*, Technical report, Risø National Laboratory, DK-4000 Roskilde, Denmark (1983)) and the wake deflection model presented Jiménez Á, Crespo A and Migoya E, *Application of a LES technique to characterize the wake deflection of a wind turbine in yaw*, Wind Energy 13: 559-572 (2010), both of Jensen and Jimenez incorporated by reference herein in their entirety. The FLORIS model may define multiple (e.g., three) zones within the turbine wake. The overlap area of each zone with a downstream turbine's rotor-swept area may be used to estimate the effective wind speed of downstream turbines. Each of the wake zones may have a uniform crosswind velocity profile and a unique velocity deficit decay rate defined. The offset and velocity deficit of the wake may be determined by the yaw and relative position of the turbine. The FLORIS model parameters may be tuned using data from high-fidelity, LESbased computational fluid dynamics simulations performed with the Simulator for Onshore/Offshore Wind Farm Applications (SOWFA) (see Fleming P et al., *Simulation comparison of wake mitigation control strategies for a two-turbine case*, Wind Energy 18: 2135-2143 (2015), incorporated by reference in its entirety).

With regard to the wake center, the original FLORIS model may define the wake center as:

$$y_{w,i}(x) = Y_i + \delta y_{w,rotation,i}(x) + \delta y_{w,yaw,i}(x, \gamma_i, a_i) \quad (1)$$

where the three terms represent the crosswind location of the turbine (Y), wake offset due to the rotation of the turbine's rotor ($\delta y_{w,rotation}$), and wake offset due to the yaw angle of the turbine ($\delta y_{w,yaw}$). The rotation term may be a function of the downstream location of interest (x):

$$\delta y_{w,rotation,i}(x) = a_d + b_d[x - X_i] \quad (2)$$

where $a_d$ and $b_d$ are parameters that control the wake offset due to rotation and $X_i$ is the downstream location of turbine i. The yaw term is a combination of $f_1$ and $f_2$, that are functions of x and the wake angle ($\tau_{init}$), $$\delta y_{w,yaw,i}(x) = f_1(x, \xi_{init}(a_i, \gamma_i)) - f_2(\xi_{init}(a_i, \gamma_i)) \quad (3)$$

where $\xi_{init}$ is a function of the wind turbine's axial induction (a) and yaw angle ($\gamma$) as defined by Jimenez et al., *Application of a LES technique to characterize the wake deflection of a wind turbine in yaw*, Wind Energy 13: 559-572 (2010):

$$\xi_{init}(a_i, \gamma_i) = \frac{1}{2} \cos^2(\gamma_i)\sin(\gamma_i)C_T(a_i) \quad (4)$$

With regard to wake diameter, the diameter of each zone q of the wake of turbine i at downstream location j may be defined as:

$$D_{w,i,j,q} = \max(D_{r,i} + 2k_e m_{e,q}[x - X_i], 0) \quad (5)$$

where $D_{r,i}$ is the rotor diameter of turbine i, q=1, 2, 3 for each wake zone respectively, and $k_e$ and $m_{e,q}$ are coefficients controlling zone expansion.

With regard to velocity deficit, the velocity in the wake may be defined as:

$$U_{w,i}(x,y) = U[1 - 2a_i c_i(x,y)] \quad (6)$$

for x greater than $X_i$ with U being the freestream wind speed and the wake decay coefficient defined as:

$$c_i(x, y) = \begin{cases} c_{i,1} & \text{if } r \leq D_{w,i,j,1}(x)/2 \\ c_{i,2} & \text{if } D_{w,i,j,1}(x)/2 < r \\ & \quad \leq D_{w,i,j,2}(x)/2 \\ c_{i,3} & \text{if } D_{w,i,j,2}(x)/2 < r \\ & \quad \leq D_{w,i,j,3}(x)/2 \\ 0 & \text{if } r \geq D_{w,i,j,3}(x)/2 \end{cases} \quad (7)$$

where r is the radial distance from the wake center line to the point of interest and $c_{i,q}$, the local wake decay coefficient, is defined as:

$$c_{i,q} = \left[\frac{D_{r,i}}{D_{r,i} + 2k_e m_{U,q}(\gamma_i)[x - X_i]}\right]^2 \quad (8)$$

where $m_{U,q}(\gamma_i)$ controls the recovery rate of each wake zone q respectively.

FIG. 1B further includes filter 162, which may filter the output from the CFD Model 160. As discussed above, the CFD Model 160 outputs the turbines for yawing and the amount of yaw (e.g., a turbine identification (e.g., turbine ID) and an associated indication to yaw or not to yaw (e.g., "0" indicates no yaw; "1" indicates yaw); and a recommended yaw angle for those turbines indicated to yaw). In certain instances, the output of the CFD Model 160 may be rejected or amended in part or in whole. By way of example, in the event that the CFD Model 160 outputs a recommended yaw angle less than 2 degrees for a respective turbine, this is interpreted as having little to no effect in reducing the wake. As such, filter 162 modifies the output of the respective turbine to indicate no yawing for the respective turbine (in effect changing the recommended yaw angle to zero for the respective turbine). In this regard, filter 162 may implement one or more rules or guidelines to modify the output of the CFD Model 160.

FIG. 1B further illustrates probabilistic network 170, which may comprise an evolutionary probabilistic network (e.g., probabilistic networks that may change as a function of time). In one or some embodiments, the probabilistic network 170 may predict the state of one, some, or all of the turbines in a specific wind farm. Further, the probabilistic network 170 may comprise a feedforward neural network.

In one or some embodiments, the probabilistic network 170 may predict one of a plurality of potential states, such as any one, any combination, or all of: being waked; going offline; under-performing; or being derated. Other states are contemplated. As discussed in more detail below, the probabilistic network 170 may generate an associated probability of any individual state or any combination of states as an indicator of the potential or the likelihood of the associated state (or states). As discussed above, one potential state comprises whether the respective turbine is being waked. As discussed in more detail below, the wake rose may be used by the probabilistic network 170 in determining the probability of the respective turbine being waked. Another potential state comprises going offline. Various reasons may cause a turbine to go offline, such as any one, any combination, or all of: a foreign object striking the turbine; internal damage to the turbine; lighting strikes; etc. Thus, the probabilistic network 170 may likewise determine as associated probability for the respective turbine to go offline. Yet another potential state comprises under-performing. As discussed in more detail below, analysis of past performance, such as manifested in Inferential Model Evaluating Historical Performance 190, may assist in determining whether a respective turbine may under-perform. As such, Inferential Model Evaluating Historical Performance 190 may provide input to the Probabilistic Network 170 indicative of whether a respective turbine may underperform, as discussed further below. Still another potential state comprises being derated (e.g., operationally dependent based on excessive wind speed, such as derating a turbine responsive to the wind being greater than 12 m/s).

As shown in FIG. 1B, the input to the probabilistic network 170 includes one or more operational constraints related to internal and/or external operational constraints (e.g., any one, any combination, or all of: wind turbine data (e.g., any one, any combination, or all of: maintenance logs; repair history; performance history; etc.) or external data (e.g., any one, any combination, or all of: weather data; $3^{rd}$ party data; wake rose (discussed further below); etc.). FIG. 1B further illustrates the output of the probabilistic network 170 is a probability of an operationally dependent state(s) of the wind turbines. In one or some embodiments, the probabilities of the operationally dependent state(s) of the wind turbines are an example of a list of the operationally dependent state(s) of the one or more wind turbines. As discussed further below, the probabilities of the operationally dependent state of the wind turbines may be used to determine whether a respective turbine is a candidate for yawing, and in turn an operationally-dependent list of wind turbine(s) for potential wake steering. In this regard, the probabilistic network 170 may be used to generate the operationally-dependent list of wind turbine(s) for potential wake steering.

The probabilistic network 170 may generate the probabilities of one or more states in one of several ways. In one or some embodiments, the probabilistic network 170 may determine the probability of any one, any combination, or all of: a respective turbine being waked; a respective turbine going offline; a respective turbine underperforming; and a respective turbine being derated. As one example, the probabilistic network 170 may determine the probability of a respective turbine being waked based on the wake rose, discussed further below with regard to FIGS. 3A-C. As another example, the probabilistic network 170 may determine the probability of a respective turbine going offline based on: (i) a schedule of taking turbines offline to perform maintenance (e.g., if the schedule indicates that the respective turbine is currently scheduled for maintenance, the probability of going offline is designated as high); and/or (ii) an analysis of the history of when turbines are taken offline for maintenance (e.g., estimating, based on analysis of when turbines are taken offline for maintenance, the probability of maintenance at the current time). As still another example, the probabilistic network 170 may determine the probability of underperforming based on input from Inferential Model Evaluating Historical Performance 190. As yet another example, the probabilistic network 170 may determine the probability of derating based on a historical analysis of wind speeds to determine the probability of a wind speed higher than the threshold for derating of the respective turbine.

An example of an evolutionary probabilistic network comprises a Bayesian network (also known as a Bayes network or a decision network). In one or some embodiments, the Bayesian network comprises a probabilistic graphical model that represents a set of variables and their conditional dependencies via a directed acyclic graph (DAG). Bayesian networks may be used for taking an event that occurred and predicting the likelihood that any one of several possible known causes was the contributing factor. For example, the Bayesian network may predict the state in which one, some or each wind turbine in the wind farm is expected to reside based on historical data, as discussed in further detail below.

More specifically, a Bayesian network-based prediction model may be used by the wake steering system 122 to forecast probability (or probabilities) of the state(s) of a respective turbine (e.g., the probability of being waked, the probability of going offline, the probability of under-performing, the probability of being derated, etc.). For example, the wake steering system 122 may train a Bayesian network based prediction model on the historical data, such that the Bayesian network is configured to predict the various probabilities. In this way, output of the Bayesian network may be used in order to determine whether a respective turbine is a candidate for yawing, and in turn may be used in combination with the CFD model 160, as described further below.

In one or some embodiments, the Bayesian network may include a directed acyclic graph (DAG) that includes a set of nodes and a set of edges. The set of nodes may represent particular historical performance indicators and the set of edges may represent relationships between the particular historical performance indicators. The set of nodes may include node metadata that is used to store a set of probability tables. A probability table may identify a probability of a node being in a particular state. The particular state may identify a predicted value of a performance indicator or a range of predicted values associated with the performance indicator.

In practice, one or more components may be involved in learning a Bayesian network including: (i) structure learning, which involves discovering the DAG that best describes the causal relationships in the data, and (ii) parameter learning, which involves learning about the conditional probability distributions. Example methods for determining the structure of the DAG are the DAG search algorithm and the K2 algorithm. Both of these algorithms may assign equal prior probabilities to all DAG structures and search for the structure that maximizes the probability of the data given the DAG is maximized. This probability may be known as the Bayesian score. Once the DAG structure is determined, the maximum likelihood estimator is employed as the parameter learning method. Note that it may be important to incorporate prior knowledge about causal structures in the parameter learning process. Thus, in one or some embodiments, prior knowledge regarding the potential states of the wind turbines may be incorporated. Alternatively, in the absence of prior knowledge, the four probabilities may be inferred using the observed data.

As discussed above, the probabilistic network 170 may determine associated probabilities for one or more potential states of the turbine. The probabilities may be analyzed in combination (e.g., by multiplying the probabilities together and/or weighting the probabilities) or individually. In one or some embodiments, the probabilities for each of the states are given equal weight. Alternatively, different weights may be assigned to the probabilities based on assigned relative importance. As one example, the probability of being offline, being derated, under-performing and being waked may be considered in order of priority from highest to lowest. As another example, one or more turbine safety checks may be implemented to further safeguard the wind turbines and to comply with warranty limitations (e.g., if the number of yaw steers for a respective wind turbine is greater than a predetermined threshold, the respective wind turbine is not yawed; if the yaw angle change for the respective wind turbine is greater than a yaw angle change threshold, the respective wind turbine is not yawed; if the yaw angle for the respective wind turbine is greater than a predetermined yaw range limit (which may be based on the warranty for the respective wind turbine), the yaw change may be reduced to be less than the yaw range limit). Further, in one or some embodiments, the assigning of the importance may be determined by the ML model 180.

Moreover, in one or some embodiments, the system, including any one, any combination, or all of the probabilistic network 170, the ML model 180, or the Inferential Model Evaluating Historical Performance 190 may be independent of qualities of the wind turbines (e.g., independent of the manufacturer of the turbine) and/or independent of the wind farm site. For example, the ML model 180 may be configured to be independent of factors associated with the turbines (including all factors associated with the turbines) and/or factors associated with the wind farm site (including all factors associated with the wind farm site). As discussed above, the functioning of individual turbines in a wind farm may be any one, any combination, or all of: independent, dependent, and inter-dependent simultaneously. Nevertheless, the ML model 180 examines various factors, include any one, any combination, or all of the independence, dependence and inter-dependence of the wind turbines, irrespective of the specifics of the turbines (e.g., irrespective of the manufacturer of the turbine, the design of the turbine, the mechanical machinery of the turbine (e.g., the blades, the rotor, the nacelle parameters, etc.)). As such, the ML model 180 may generate yaw recommendations for different wind farms that may have different mixes of turbines in the same wind farm.

Moreover, site selection is typically an important consideration for wind farm establishment. Various factors are typically considered in the wind farm site selection such as average wind speeds, high wind density locations, topographical assessment and seismic studies. Nevertheless, in one or some embodiments, the ML model 180 may be considered site-independent. For example, the ML model 180 may be independent of any aspect of the site, such as the topography, the elevation, the average wind speeds, or seismic studies. In particular, the ML model 180 need not know any of the site specifics in order to generate a recommended yaw angle. In particular, irrespective of the topography or the average wind speeds for the wind farm site in question or irrespective of the factors used in the site selection process, the ML model 180 is trained to generate the yaw angle recommendations based on factor(s) of the current wind. For example, in one or some embodiments, the ML model 180 need only the current wind speed and current wind direction to generate the yaw angle recommendations. Further, as described herein, the recommendation may be adjusted depending on the bins, which may be defined via the ML model 180. In addition, since the adjustment may happen in multiple ways, the ML model 180 may look for one or more specific forms of interpolation that relate to the particular adjustment that is needed. Likewise, in one or some embodiments, the geographical location of wind farm site has no bearing on the ML model 180 (e.g., whether the wind farm site has an adjacent wind farm that may be causing wakes in the wind farm site).

For example, the probabilistic network 170, the ML model 180, or the Inferential Model Evaluating Historical Performance 190 are independent of whatever particular turbines are used at a turbine site at issue. In particular, the analyses performed by the probabilistic network 170, the ML model 180, or the Inferential Model Evaluating Historical Performance 190 are such to remove dependence on the specific turbine aspects (such as turbine manufacturer). As one example, the Inferential Model Evaluating Historical Performance 190 may analyze underperformance by analyzing the history of a respective turbine (such as by calculating the mean efficiency, which may be compared with mean efficiency of other turbines, effectively removing manufacturer dependence), thereby removing dependence on the specifics of the respective turbine itself. As another example, the ML model 180, in its training, may thereby generate output that is independent of turbine manufacturer. In this regard, different wind turbine sites, with different combinations of types of turbines, may both use the disclosed system without tailoring to the specifics of the types of turbines located at the different turbine sites.

Further, the probabilistic network 170, the ML model 180, or the Inferential Model Evaluating Historical Performance 190 may be independent on the wind farm site. In practice, a wind farm site at issue may (or may not) be proximate to another wind farm site (e.g., sufficiently proximate so that wakes generated by turbine(s) at another wind farm site affect turbine(s) at the wind farm site at issue. Proximity to another wind farm may result in the wind entering the wind farm site already being waked. Because of this, the wind speed and/or wind direction, as sensed by the sensors, may be different from the actual wind speed and/or actual wind direction experienced by the wind turbines at the wind farm site at issue. For example, the actual wind speed may actually be lower (due to waking) than the sensed wind speed. As such, any one, any combination, or all of the probabilistic network 170, the ML model 180, or the Inferential Model Evaluating Historical Performance 190 may be configured to be independent of the wind farm site.

For example, the ML model 180, by its training, inherently may incorporate the discrepancy that the wind speed experienced by a specific wind turbine may be different from the sensed wind speed. In particular, in one or some embodiments, the sensed wind speed may have multiple possibilities, such as four possibilities (e.g., sensed wind speed from LIDAR, sensed wind speed from anemometer; sensed wind speed from Doppler; and sensed wind speed from a wind vane and two alternate measuring points, such as a turbine and Met Tower). Wind speeds may be different, such as slower, based on the location or point of measurement. Anemometers for instance may be positioned at the back of the nacelle and hence the measured wind speed measured may be slightly lower than the actual wind speed. LIDAR may be accurate up until a certain height, and wind vanes, being mechanical units, may not be entirely accurate as well. Typically, a wind operations team may decide which, among the potential options to determine wind speed, is the most preferred based deviations from the actual (e.g., both historic and current). For example, various options to determine the wind speed and/or wind direction are discussed further with regard to FIG. 2. Regardless, even if the system does not know which option has chosen to determine the wind speed, the ML model 180 may generate the described predictions regardless of the option selected. Rather, the ML model 180 does not treat this as a limitation. Instead, due the inputs to the ML model 180 being binned, the exact number or the precise measurement is of lesser importance than the bin itself (e.g., wind speed and wind directions). Hence, even if there is a discrepancy between the actual wind speed and the recorded wind speed from the preferred measurement choice, the difference may not affect the ML model 180.

Moreover, multiple sensors may be positionally distributed at the wind farm site. The system, in selecting the sensed wind speed and wind direction, may select the wind speed and wind direction from a sensor that is positioned closest to the specific turbine at issue to reduce the effect of incoming wakes to the wind farm site direction.

In one or some embodiments, the analysis of the probabilities may comprise comparing the probabilities (alone and/or in combination) to a threshold (such as a predetermined threshold). For example, the combined probabilities may first be compared to a predetermined threshold; after which, individual probabilities may be analyzed (e.g., responsive to determining that the probability of a respective turbine being waked or going offline is greater than a threshold, the respective turbine is considered not to be a good candidate for wake steering from an operational standpoint). In one or some embodiments, the probabilistic network 170 may perform such analyses in order to determine which turbine(s) are candidates, from an operational standpoint, for wake steering.

As shown in FIG. 1B, the outputs from the CFD model 160 and the probabilistic network 170 are an operationally independent set of turbines to yaw and the amount of yaw, and the operationally dependent state of the turbines, respectively. The outputs are input to machine learning (ML) model 180, which may, in turn, generate the yaw recommendations based on the one or more factors discussed herein (e.g., being waked; being offline; under-performing; being derated; number of yaw steers in a predetermined time period; extent of yaw angle change; or limit as to yaw angle change). ML model 180 may result from any type of machine learning (such as machine learning based on linear regression) that is built based on training data in order for the ML model 180 to perform the requisite reconciliation. Various types of training are contemplated for the ML model 180 including supervised learning and unsupervised learning. It is contemplated that any type of artificial intelligence, whether machine learning, deep learning, or neural networks, are contemplated in order to build a model, such as ML model 180, in order to generate the operationally dependent set of turbines to yaw and the amount of yaw for input to PLC code generator 124. Thus, the ML model 180 comprises an example of a mathematical and/or logical model, and more specifically, a learning layer/model. In one or some embodiments, the ML model 180 is configured to reconcile the outputs of the wind performance simulation model (e.g., an example of which is the CFD model 160 depicted in FIG. 1B) and the state model indicative of the state of the turbine(s) (e.g., an example of the state model comprises the probabilistic network 170).

In one or some embodiments, the probabilistic network 170 includes input from Inferential Model Evaluating Historical Performance 190, as shown in FIG. 1B. In this implementation, the probabilistic network 170 is not restricted to the present operational state and may receive input based on analysis of historical performance. As discussed above, the probabilistic network 170 may generate the probabilities of one or more potential states of the turbine, such as the probability of underperforming. In order to generate the probabilities, the probabilistic network 170 may send a request to Inferential Model Evaluating Historical Performance 190 for Inferential Model Evaluating Historical Performance 190 to determine whether any of the potential turbine(s) in the request are underperforming. Responsive to the request, Inferential Model Evaluating Historical Performance 190 may respond by sending an indication of performance (e.g., whether a respective turbine is performing or not performing). Upon receipt, probabilistic network 170 may generate the probability of underperforming for a respective turbine. In turn, based on the probability of underperforming for the respective turbine, the ML model 180 may or may not select the respective turbine for yawing (e.g., an underperforming turbine is not selected for yawing since yawing of the underperforming turbine will degrade performance even further).

In practice, one or more metrics may be used to determine whether a respective turbine is underperforming. Example metric(s) may be based on the amount of energy produced by the respective turbine in a given period, such as the efficiency of performance in the given period. In this regard, Inferential Model Evaluating Historical Performance 190 may access a database that stores the energy production for the respective turbine, determine a historical performance indicator (e.g., historical energy production and/or historical efficiency for the respective turbine and/or for another turbine at the site) from a previous point in time and/or a previous period (e.g., calculate the mean value of turbine power over the last 30 days; calculate the mean value of turbine power over the last 60 days; calculate the turbine power 1 month ago; calculate the turbine power 2 months ago; etc.), and compare the historical performance indicator with a current performance indicator (e.g., current energy production and/or current efficiency). Thus, in one embodiment, the comparison may comprise comparing the current performance indicator for the respective turbine with the past performance indicator for the respective turbine (e.g., current efficiency of the respective turbine compared with historical efficiency of the respective turbine). Alternatively, or in addition, the comparison may comprise comparing the current performance indicator for the respective turbine with performance indicator (past and/or present) for another turbine at the site. In this regard, the comparison may indicate a statistical understanding whether the respective turbine is underperforming.

Responsive to the comparison (e.g., responsive to determining that the current performance indicator is comparatively speaking less by at least a predetermined amount, such as 5% less, 10% less, etc.), Inferential Model Evaluating Historical Performance 190 may send an indication of performance (e.g., an indication whether the responsive turbine is underperforming or is performing acceptably) to the ML Model 180. In one embodiment, ML model 180 may send Inferential Model Evaluating Historical Performance 190 a list of turbines that ML model 180 is considering yawing. In response thereto, Inferential Model Evaluating Historical Performance 190 may statistically determine whether any of the turbines in the list are underperforming, and send the indication (e.g., indication that turbines in the list are performing or underperforming) to ML model 180. Alternatively, responsive to ML model 180 requesting an indication of performance or underperformance, Inferential Model Evaluating Historical Performance 190 may send ML model 180 the indication of performance or underperformance for all turbines at the site. In either instance, in one or some embodiments, underperforming turbines are not selected for yawing. As such, responsive to ML model 180 receiving the indication of performance or underperformance, the ML model 180 may determine whether to remove one or more turbines as potential candidates for yawing based on the indication of performance or underperformance.

As one example, prior to reconciling the output from the CFD model 160 (indicating a first list of turbine(s) to yaw) and the output from the probabilistic network 170 (indicating a second list of turbine(s) to yaw), ML model 180 may request Inferential Model Evaluating Historical Performance 190 to evaluate one, some or all turbines in the site for performance Responsive to the request, Inferential Model Evaluating Historical Performance 190 sends an indication of the performance (e.g., whether any of the turbines in the site are underperforming). As discussed above, in one or some embodiments, the methodology may remove one or more permutations from evaluation by the ML model 180. For example, responsive to receiving the indication, ML model 180 may then remove the turbines that are underperforming prior to reconciling the outputs. In this way, the reconciled outputs will not include any turbine that is underperforming. Alternatively, permutations directed to an underperforming turbine may nevertheless be evaluated by ML model 180.

As another example, the ML model 180 may first determine an initial list of potential turbine(s) to yaw based on reconciling the output from the CFD model 160 and the output from the probabilistic network 170. Thus, in one or some embodiments, the ML model 180 may be any one, any combination, or all of: autotuned (e.g., to select the correct wind turbine set); auto adjusting (e.g., selecting the correct yaw angles); autocorrecting (e.g., determining whether to perform a new computation based on a trigger); or auto storing (e.g., determine whether it is worthwhile to store the most recently determined solution for future use). In this regard, in one or some embodiments, the ML model 180 may include the ability to determine whether to run or not to run itself (e.g., the intelligence to determine whether to re-run the ML model 180, such as based on whether the operational conditions have sufficiently changed).

In one or some embodiments, PLC code generator 124 is configured to generate commands in order to control turbine controller(s) 130 for yawing the set of turbine(s) to the amount of yaw as dictated by ML model 180. An example of generating the commands is disclosed in U.S. Pat. No. 10,428,796, incorporated by reference herein in its entirety. In practice, the ML model 180 may automatically determine the set of turbine(s) to yaw and the amount of yaw and automatically command the PLC code generator 124 to generate the commands in order to control turbine controller (s) 130 for yawing. In turn, the turbine controller(s) 130 may automatically control the wind turbine(s) 140 that are included in the set of turbine(s) dictated by the ML model 180 to the amount of yaw dictated.

FIG. 2 is a second example block diagram 200 illustrating a high level system architecture for operating wind turbines in connection with one or more wind sensors. Specifically, FIG. 2 illustrates virtual machine 210, which may comprise a Data Science Model. Virtual machine 210 may include FLORIS model 212, which may receive the wind speed and wind direction. In turn, FLORIS model 212 may generate yaw recommendations, as discussed above. Further, virtual machine 210 may include bin 214 (which may be configured to perform the binning discussed above) and interpolation 216 (which is discussed above and further below). After which, a series of checks may be performed, such as one or both of turbine candidate check 218 and M/C check 220. As discussed above, various checks may be performed for evaluating a specific option (e.g., permutation) for yawing. In one or some embodiments, turbine candidate check 218 may analyze one or more aspects of the respective wind turbine, such as based on whether communication is available to the respective wind turbine (e.g., via heartbeat communications, discussed further below), based on the respective turbine status, based on the current yaw angle of the respective wind turbine, etc. Thus, turbine candidate check 218 and M/C check 220 may be used to analyze the respective turbine from a historical standpoint and/or from a day-to-day standpoint. Thus, the factors for turbine candidate check 218 and M/C check 220 may comprise any one, any combination, or all of: being waked; being offline; under-performing; being derated; number of yaw steers in a predetermined time period; extent of yaw angle change; or limit as to yaw angle change.

Virtual machine 210 may further include virtual automation device 222. As discussed in more detail below, automation device 230 may receive the yaw offset recommendations for implementation (either fully automatically without any operator input or partially automatically based on approval from the operator). In one or some embodiments, automation device 230 may be a one-way communication in which the virtual machine 210 transmits the yaw offset recommendations and does not receive direct communication back from the automation device 230 (in one or some embodiments, the virtual machine 210 may receive feedback from logging device 270 indicative of whether the yaw recommendation was implemented, such as approved by the operator, discussed in more detail below). For example, for security of the grid, automation device 230 may be insulated from transmitting information from automation device 230. Rather, automation device 230 may only be configured to transmit to a limited number of devices, such as to wind turbines 250 (e.g., transmitting the heartbeat and/or transmitting the yaw offset controls (either directly or via operator check device 260)). Thus, in one or some embodiments, the virtual machine 210 may not directly determine whether there was an error in implementing the yaw offset recommendations. In order to remedy this, virtual automation device 222 may be used. Specifically, virtual automation device 222 may comprise a software twin (e.g., from a functionality standpoint) of automation device 230. As such, yaw offset recommendations may be transmitted to virtual automation device 222 as a form of simulation of implementing the yaw offset recommendations, with virtual automation device 222 providing feedback indicating whether there was an issue in implementing the yaw offset recommendations. In practice, virtual automation device 222 may test the yaw offset recommendations to determine whether virtual automation device 222 indicates the desired response. If the desired response is received, virtual machine 210 transmits the yaw offset recommendations to automation device 230.

Automation device 230 may comprise the intermediate device between the virtual machine 210 and one or more other devices, such as operator check device 260, Met Towers (interchangeably termed a meteorological tower) 240, and wind turbines 250. In one or some embodiments, automation device 230 may comprise Kepware software or other similar industrial connectivity solution.

In one or some embodiments, automation device 230 may communicate with one, some or all of wind turbines 250 in the wind farm. Various communications are contemplated, such as a heartbeat communication (which may be indicative of normal operation of the wind turbines) and/or other status information (e.g., current yaw angle, turbine status, etc.). For example, failing to receive the heartbeat communication from the wind turbines may indicate a loss of communication, and in turn, may trigger the virtual machine 210 to stop generating yaw offset recommendations for wind turbines that are not in communication. In turn, automation device 230 may route the status information to turbine candidate check 218.

In one or some embodiments, automation device 230 may further receive one or more aspects of the wind, such as wind speed data and wind direction data from one or more wind sensors. The wind sensors may be on Met Towers or on the wind turbines themselves (e.g., wind vane to indicate wind direction and anemometer for wind speed). For example, automation device 230 may receive the wind speed data and wind direction data from one or more Met Towers 240, such as Met Tower 1 242 to Met Tower N 244, where N is a number greater than 1.

After which, the wind speed and wind direction may be calculated (either at automation device 230 or virtual machine 210). For example, the wind speed and wind direction may be determined based on wind speed data and wind direction data from: any one, any combination, or all of: Met Towers (e.g., a primary Met Tower closest (physical distance-wise) to the respective wind turbine at issue; a secondary Met Tower second closest to the respective wind turbine at issue); wind turbine-associated data (e.g., sensors resident on the wind turbines); historical data; etc. In one or some embodiments, yaw recommendations may be based on (in order of priority): (1) Met Tower data (e.g., from the primary Met Tower if available and/or the secondary Met Tower if available); (2) wind turbine-level data (optionally with Nacelle-transfer function corrections to the sensed data); (3) use of historical recommendations to provide yaw settings in similar current conditions; or (4) absent reliable data in (1)-(3), defaulting to no-yaw state (e.g., no yawing is performed). Alternatively, the wind speed and wind direction may be solely dependent on Met Tower data. In the event that Met Tower data is unavailable or unreliable, the system defaults to a no-yaw state.

FIG. 2 further illustrates operator check device 260, which may receive yaw offset recommendations (such as via automation device 230). In practice, an operator at operator check device 260 may input (e.g., via a touchscreen) as to whether to accept or reject the yaw offset recommendation(s). For example, the operator of the wind farm may receive the yaw offset recommendation, the current conditions (e.g., prevailing wind conditions), and the specifics of the respective wind turbine subject to the yaw offset recommendation (e.g., where the respective wind turbine is located within the wind farm), and determine whether, based on using "on the ground information" known to the operator, decide whether to implement the yaw offset recommendation. Thus, FIG. 2 depicts an at least partly manual configuration in which the operator may manually input acceptance prior to implementation of the yaw offset recommendations (with other parts, including generating the yaw offset recommendations and sending/executing the commands after acceptance by the operator being executed automatically). Alternatively, the operation is fully automated, without any input from the operator to execute the yaw offset recommendation.

In one or some embodiments, the operator, in rejecting a respective yaw offset recommendation, may further include a reason for the rejection. Responsive to accepting the yaw offset recommendation, the operator device may send the yaw offset recommendation (e.g., in the form of yaw offset control command(s)) to the wind turbines 250, such as to a specific wind turbine subject to the yaw offset recommendation (e.g., wind turbine 1 252 to wind turbine M 254). Thus, as illustrated in FIG. 2, virtual machine 210 does not communicate directly with wind turbines 250 (instead via one or both of automation device 230 and/or operator check device 260). Alternatively, virtual machine 210 may communicate directly with wind turbines 250.

Further, in one or some embodiments, operator check device 260 may send the acceptance and/or rejection (and the optional reason for the rejection) to logging device 270, which may store the acceptance and/or rejection. Alternatively, or in addition, the rejection of the yaw offset recommendations (and the reasons) may be routed back to virtual machine 210 (such as via logging device 270) in order for virtual machine 210 to retrain its machine learned model. In one or some embodiments, the yaw offset recommendations may further be transmitted to logging device 270 directly from virtual machine 210, as shown in FIG. 2.

As discussed above, the probabilistic network 170 determines the likelihood that a respective turbine will be waked. In one or some embodiments, the probabilistic network 170 may make this determination based on the wake rose, which in FIG. 1B is shown as being input thereto. In one layout of a wind farm, the turbines may be positioned in rows. In one or some embodiments, the probabilistic network 170 may examine only whether downstream turbines (e.g., turbines after the first row from the perspective of the wind direction) are being waked. As discussed above, in one or some embodiments, it is a general (although not an absolute) rule not to wake steer turbines that are themselves being waked.

There is a higher likelihood of downstream turbines (from the perspective of wind direction) being waked. Thus, in one or some embodiments, the methodology only examines upstream turbines (e.g., only the first row of turbines). This is shown, for example, in FIG. 3A, which is an illustration 300 of a set of turbines 302, 304, 306, 308, 310, 312, 314, 316, 318, 320, 322 (in a first row from the perspective of the wind direction) and 330, 332, 334, 336, 338, 340, 342, 344, 346, 348, 350 (in a second row from the perspective of the wind direction) and the different wake roses (shown as representations 352, 354, 356) affecting some of the turbines dependent on the speed of wind speed. In this way, every wind turbine may potentially either impact another turbine or be impacted by another turbine.

In one or some embodiments, the wake rose is dependent on operational constraints, which is in contrast to the wind rose, which is independent of operational constraints. Further, as illustrated in FIG. 1B, the wind rose is input to the CFD model 160 whereas the wake rose is input to the probabilistic network 170. Thus, FIG. 1B illustrates the division of analysis, with the CFD model 160 being operationally independent and divorced from reality generating its list of turbines to wake steer, and with the probabilistic network 170 being operationally dependent and generating its list of turbines to wake steer, and with the ML model 180 reconciling the two (e.g., as a reality check of sorts for list of turbines to wake steer generated by the CFD model 160).

Figure 3A:
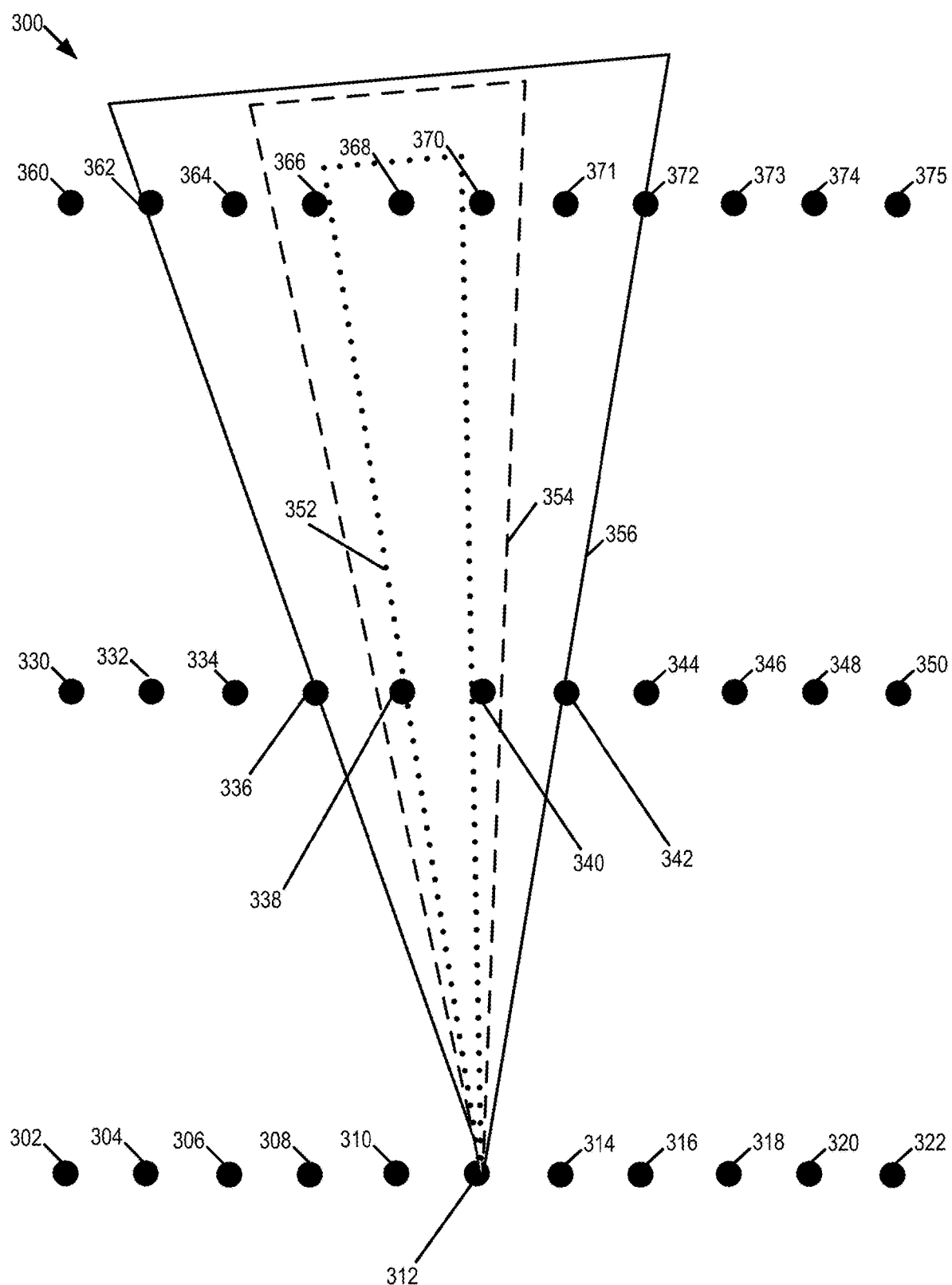
FIG. 3A is an illustration of a set of turbines and the different wake roses affecting some of the turbines dependent on the speed of wind speed.

On the one hand, in one or some embodiments, a respective turbine that is being waked may not be considered a good candidate for wake steering. On the other hand, a respective turbine that is likewise not being waked does not necessitate that an upstream turbine (from the perspective of the respective turbine) is to be wake steering since there is no waking that the wake steering is required to correct. The wake rose is one such tool, as illustrated in FIG. 3A, in which to determine whether a downstream turbine is being waked by an upstream turbine.

In one or some embodiments, the wake rose (and its associated shape), may be operationally dependent and/or site dependent, and may be determined at least in part based on any one, any combination, or all of: the wind direction; the wind speed; turbulence intensity; wind shear; or one or more physical aspects of the turbine causing the waking (e.g., the diameter of the rotor of the turbine; airflow of the blade). For example, generally speaking, the greater the wind speed, the narrower the wake rose (e.g., the shape associated with the wake rose). Conversely, the lower the wind speed, the wider the wake rose. Further, any one, any combination, or all of turbulence intensity, wind shear, or the physical aspects of the turbine may affect the shape of the wake rose. This is shown in FIG. 3A, in which the wake from turbine 312, is embodied in three separate wake roses including wake rose representation 352 (which is illustrated as a triangle, indicating the wake rose when viewed from above, which illustrates the waking of turbine 338 in row 2 caused by turbine 312), wake rose representation 354 (illustrated as a triangle which illustrates the waking of turbines 338 and 340 in row 2 caused by turbine 312), and wake rose representation 356 (illustrated as a triangle which illustrates the waking of turbines 336, 338, 340, 342 in row 2 caused by turbine 312), with the wind being at a highest speed for wake rose representation 352 (relative to wake rose representations 354 and 356, and with the wind being at a lowest speed for wake rose representation 356 (relative to wake rose representations 352 and 354). The triangles illustrated in FIG. 3A are merely an example representation of the region of waking as viewed from above. The representation may comprise a 3-D representation (such as a cone). In this regard, any discussion herein regarding a 2-D representation (such as a triangle) may equally apply to a 3-D representation. It is further noted, although the representation in FIG. 3A (shown as a triangle in 2-D) of the wake region is depicted as having straight lines, other representations may have a combination of straight lines and curved lines (in 2-D). Likewise, the representation of the wake region may be depicted as a cone, or may be depicted as a skewed cone, sheared cone, or asymmetrical cone. The curvature of the 3-D shape may be determined by any one, any combination, or all of: the wind speed; turbulence intensity; wind shear; or one or more physical aspects of the turbine.

In one or some embodiments, the wake rose decreases the further the distance from the turbine causing the wake (e.g., the turbulence caused by the turbine causing the wake decreases with distance). In this regard, in one or some embodiments, only the row immediately after the turbine causing the wake are analyzed. For example, turbine 312 is in row 1, with turbines 330, 332, 334, 336, 338, 340, 342, 344, 346, 348, 350 in row 2 are considered for possible waking. Alternatively, more than one row immediately after the turbine causing the wake are analyzed. For example, for turbine 312, turbines in row 2 and turbines in row 3, including turbines 360, 362, 364, 366, 368, 370, 371, 372, 373, 374, 375, are considered for possible waking.

Thus, separate from determining a higher (or highest) AEP in selecting the turbines to wake steer, the methodology further determines whether the turbines selected for wake steering, from an operational standpoint, are actually correcting for a wake in the downstream turbines. For example, in the event that the CFD Model 160 recommends turbines 4 and 6 to wake steer, the methodology may determine, via the wake rose, whether turbines 4 and 6 are actually causing a wake in one or more downstream turbines. Responsive to determining that turbines 4 and 6 are not causing a wake in one or more downstream turbines, the methodology may reject the output of the CFD Model 160 since its recommended action is not actually correcting for a negative impact on the downstream turbines.

Figure 3B:
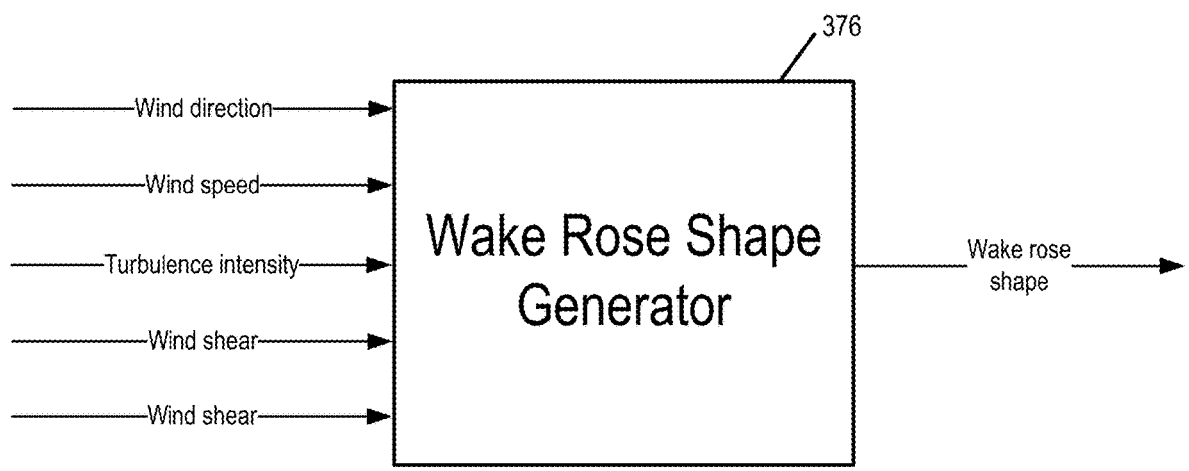
FIG. 3B is a block diagram of wake rose shape generator.

Various methodologies may be used to determine the wake rose. In one or some embodiments, it may be assumed that the fluid has a laminar flow so that linear equations may be used. Further, various inputs may be used to determine the wake rose shape. For example, FIG. 3B illustrates a block diagram of wake rose shape generator 376, which inputs wind speed, wind direction, turbulence intensity (e.g., 5% turbulence, 10% turbulence, etc.), wind shear, and one or more physical aspects of the turbine causing the waking. For example, in one or some embodiments, turbulence intensity (TI) may be the strongest measure of wake existence. When the measured TI is a positive value at a particular wind turbine generator (WTG), then it may be conclusive evidence that the particular WTG is waked. TI values may be dependent on the cone length in inverse proportion (e.g., the cone length is inversely proportional to the TI value). Thus, in one or some embodiments, the wake rose may be a manifestation of the TI, being based on the current wind speed and/or current wind direction.

In practice, wake rose shape generator 376 may generate the wake rose representation (such as a 2-D representation in the form of a triangle or the like or a 3-D representation in the form of a cone or the like). The wake rose representation may be input to the probabilistic network (such as probabilistic network 170). In turn, the probabilistic network may determine the probability of a respective turbine being waked based on the wake rose representation. For example, in one embodiment, the probabilistic network may access a layout of the wind turbine site (e.g., the latitude/longitude positions of each turbine; the relative positions of each turbine; etc.) so that the wake rose representation may be superimposed on each respective turbine potentially causing a wake, thereby determining which turbines are within the wake rose representation.

Thus, in one or some embodiments, various factors may be analyzed to determine whether, and which, turbines to wake steer. The factors may include any one, any combination, or all of: (i) determining whether the wake steering will correct for a downstream wake (e.g., via analysis of the wake rose); (ii) determining whether a higher (or a highest) AEP gain is achieved through the selection of the turbine(s) to wake steer; or (iii) determining whether the selected turbines result in the least change (e.g., smallest increment of change in selection of which turbine(s) to wake steer) in order to achieve commonality. In one or some embodiments, in response to satisfying each of (i), (ii), and (iii), interpolation of the selected turbines may be performed. Typically, there is no determination whether the wake steering actually remedies an actual downstream wake. Rather, it is typically assumed, without analysis, that the wake steering corrects for turbulence in the downstream turbines. However, as discussed above, this is not necessarily the case since the operational state of the wind farm is not typically considered in wake steering. Further, the assumption that managing a wake necessarily results in improved performance is not always correct. In particular, even when forcing a commonality, the methodology may still determine whether the forced commonality corrects for an actual downstream wake. Further, reconciling the performance versus operational constraints is typically not performed, including reconciling with a smallest increment of change.

Figure 3C:
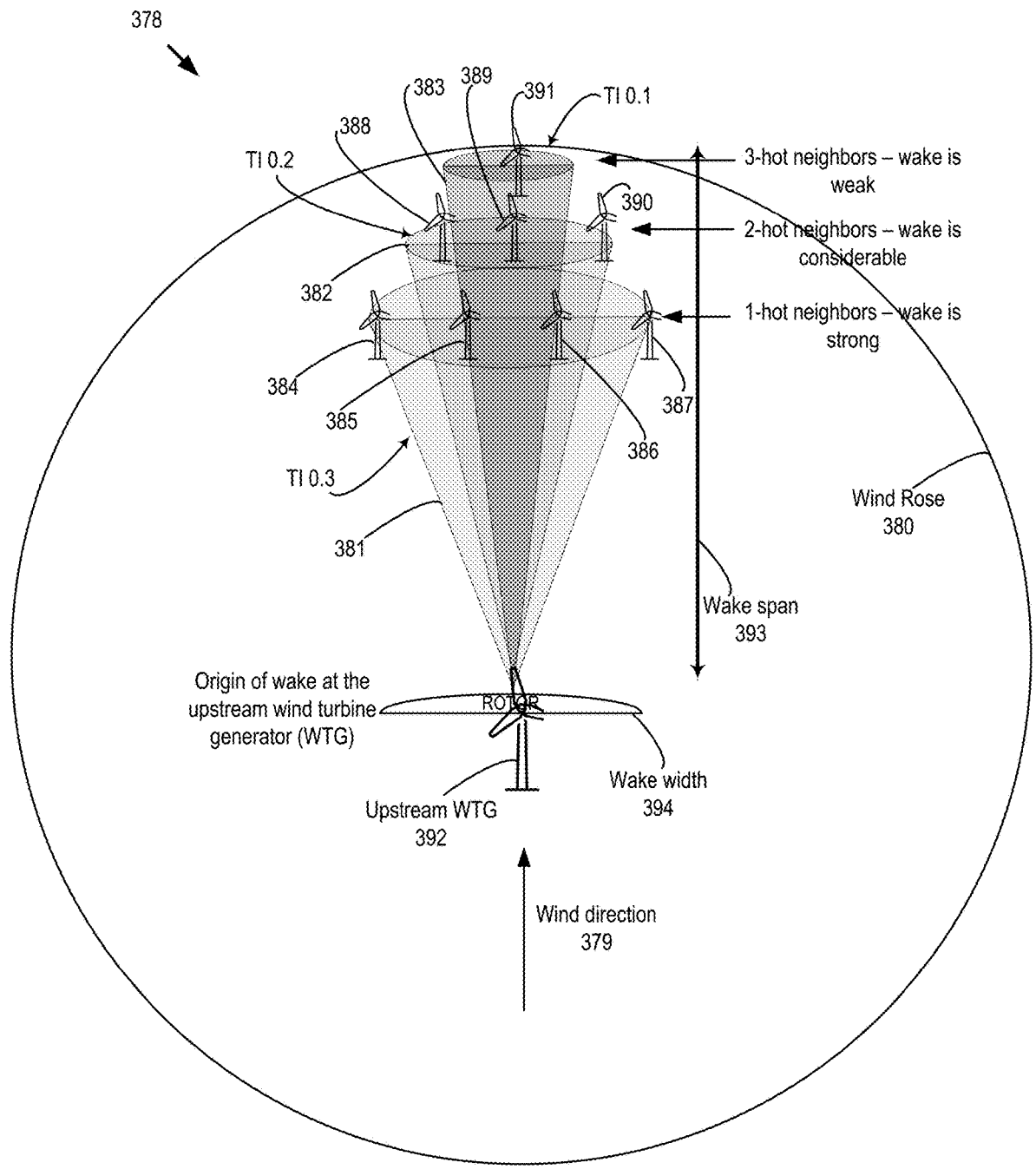
FIG. 3C is an illustration of the wake rose and the wind rose.

As discussed above, the wake rose may be represented with an associated region (e.g., a 2-D region or a 3-D region) in one of several ways, such as in the form of cones 381, 382, 383 in the illustration 378 in FIG. 3C. Other representations of the associated region are contemplated. In one or some embodiments, the cone geometry of the wake rose is consistent (or nearly consistent) across wind speeds. This is illustrated in FIG. 3C in which three different cones generally have the same shape, but with different widths and different lengths. See cone 383 (corresponding to T1=0.1); cone 382 (corresponding to T1=0.2); cone 381 (corresponding to T1=0.3).

Further, in one or some embodiments, the shape of the respective representation, such as the shape of the respective cone, may be determined or controlled by the wind speed (such as the current wind speed). For example, in one or some embodiments, higher wind speeds lead to longer wake longitudinal span and smaller lateral span, and hence a thinner cone. Conversely, smaller wind speeds lead to shorter wake longitudinal span and larger lateral span, and hence a wider cone. This is illustrated in FIG. 3C, in which a higher wind speed translates into cone 383, which has a longer cone representation (e.g., encompassing turbine 391) and a narrower cone representation than cone 381 and 382, which correspond to lower wind speeds. Further, cone 381, which corresponds to the lowest wind speeds represented in FIG. 3C, is the shortest (not encompassing turbines 388, 389, 390) and the thickest (encompassing turbines 384, 385, 386, 387). Finally, cone 382 represents the wake rose for an intermediate speed (intermediate to the speeds represented by cones 381, 383), has a length intermediate to cones 381, 383, and has a width intermediate to cones 381, 383.

In practice, the cones may be superimposed on a layout of the wind farm site in order to determine which turbines fall within a respective cone. In particular, the apex of the cone may be centered on turbine 392 (an example of an upstream wind turbine) with the wind direction 379 (e.g., the current wind direction) being used as the central axis for the cone. For example, wind direction 379 is illustrated as being in the northerly direction (e.g., in the y-direction), resulting in the axis of the cone likewise being in the northerly direction (e.g., in the y-direction). Alternatively, the wind direction may be different from that illustrated in FIG. 3C, such as at a 45° angle, resulting in the axis of the cone likewise being at a 45° angle. Further, FIG. 3C illustrates the wake span 393, which illustrates the potential span of the waking caused by turbine 392 (e.g., the longest wake is from cone 383), and the wake wide 394, which illustrates the potential width of the waking caused by turbine 392 (e.g., the widest wake is from cone 381).

FIG. 3C illustrates various downstream wind turbines as neighbors including 1-hot neighbors (representing the immediately next row of wind turbines from turbine 392); 2-hot neighbors (representing the immediate second next row of wind turbines from turbine 392); and 3-hot neighbors (representing the immediate third next row of wind turbines from turbine 392). In one or some embodiments, for longer cones due to high wind speeds (see cones 382, 383), both 1-hot and 2-hot neighbors are analyzed as they are most impacted. For shorter cones due to smaller wind speeds (see cone 381), only 1-hot neighbors are analyzed but the list of one-hot neighbors is larger due to larger lateral spread of the cone 381.

As discussed above, in one or some embodiments, both the wake rose and the wind rose may be used in determining wake steering. For example, the wind rose may be input to CFD model 160 and the wake rose may be input to probabilistic network 170. To highlight the different aspects of the wake rose versus the wind rose, the wind rose 380 is illustrated in FIG. 3C as well. The wake rose is an example of the manifestation of the wake. In practice, a wake occurs when air flow encounters an obstruction, causing the air to become separated, thereby creating a region where the air is separated. This region, with its associated structure, may be considered the wake region. The wake rose may comprise a representation of the region, with turbines located within the wake rose being subject to waking.

Figure 4A:
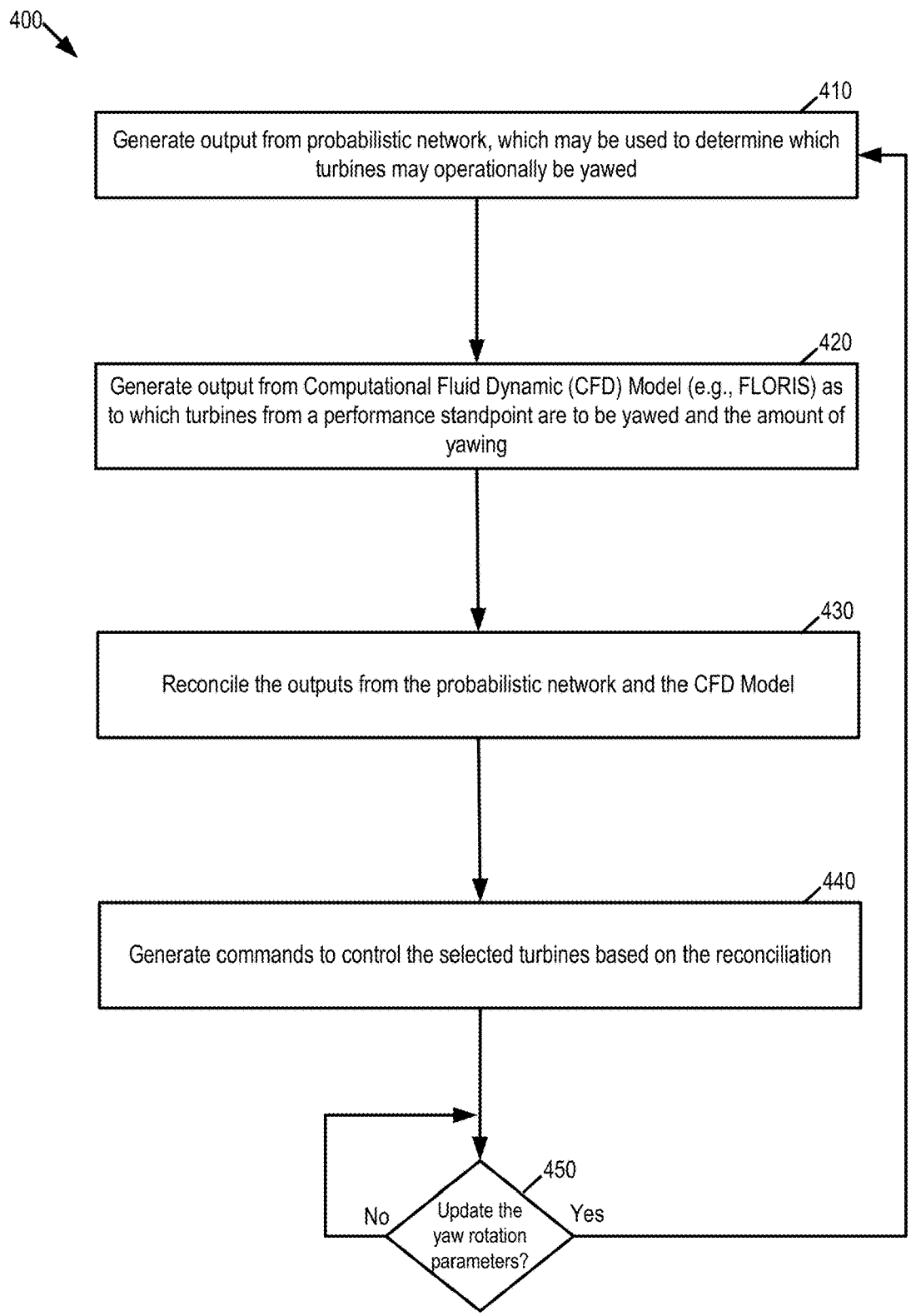
FIG. 4A is a first flow diagram of generating outputs from the probabilistic network and the CFD model and reconciling the outputs in order to control the wind turbines.

FIG. 4A is a first flow diagram 400 of generating outputs from the probabilistic network and the CFD model and reconciling the outputs in order to control the wind turbines. Specifically, at 410, the probabilistic network generates an output as to the operational state of the turbines, which in turn may be used to determine which turbines may operationally be yawed (e.g., in one embodiment, turbine(s) with probabilities of waking less than a predetermined percentage may be selected). At 420, the CFD model generates an output as to which turbines, from a performance standpoint, are to be yawed and the amount of yawing. At 430, the outputs from the probabilistic network and the CFD model are reconciled. Various types of reconciliation are contemplated, such as illustrated in FIGS. 4-7. At 440, one or more commands are generated to control the wind turbines selected for yawing. At 450, it is determined whether to update the yaw rotation parameters. Various triggers may be used to determine whether to update the yaw rotation parameters. In one or some embodiments, new information regarding one or both of the wind rose or the wake rose may trigger the update. As one example, the wind rose may be updated daily. Responsive to the daily update, first flow diagram 400 may loop back to 410. As another example, the wake rose may be updated, such as daily. Responsive thereto, first flow diagram 400 may loop back to 410. If so, first flow diagram loops back to 410. If not, first flow diagram keeps checking with to update the yaw rotation parameters.

Figure 4B:
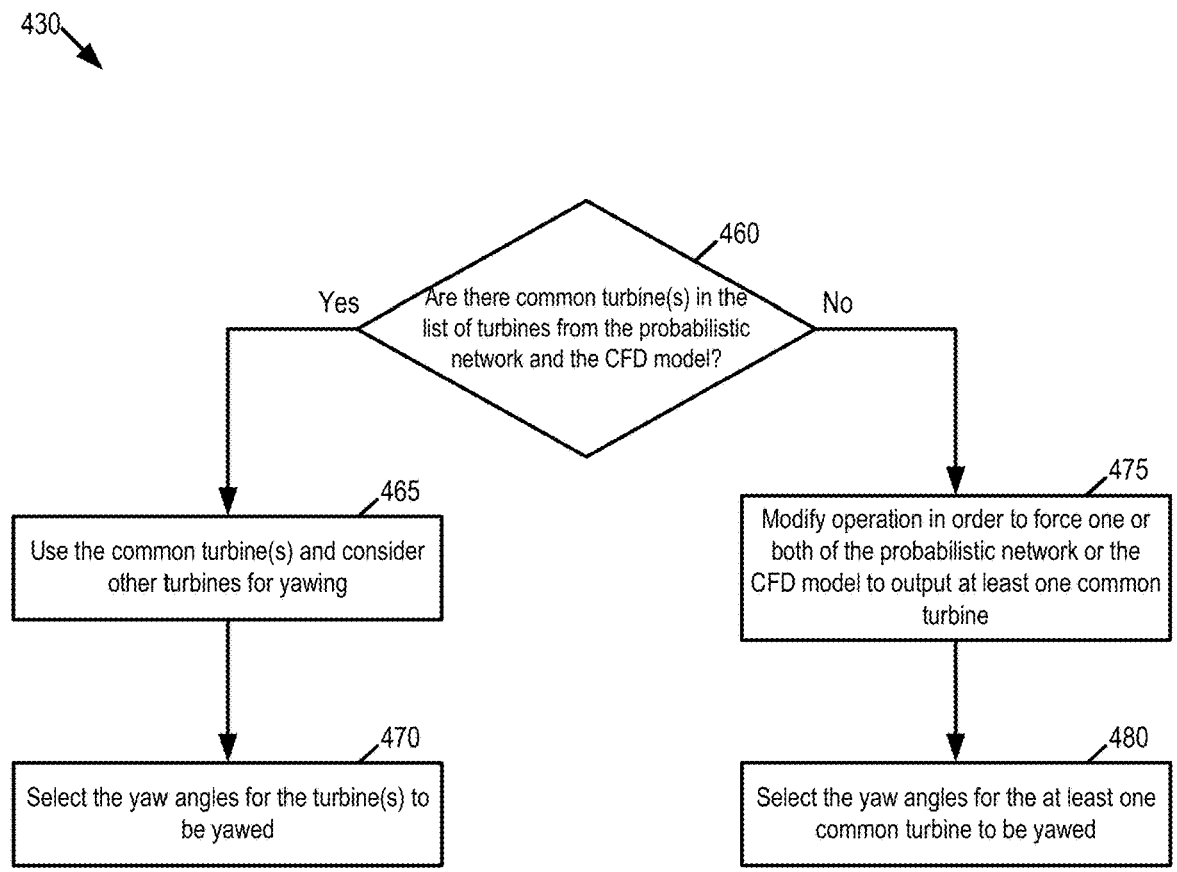
FIG. 4B is a flow diagram for reconciling the outputs from the probabilistic network and the CFD model.

FIG. 4B is a flow diagram for block 430 in FIG. 4A for reconciling the outputs from the probabilistic network and the CFD model. At 460, it is determined whether there are any turbines common in the list of turbines from the probabilistic network that are candidates for yawing and in the list of turbines recommended, from a performance standpoint, by the CFD model for yawing. If so, at 465, the common turbine(s) are considered the baseline against which other combinations of turbines for yawing are compared. By way of example, turbines 1-7 comprise a wind farm, with the CFD model outputting turbines 2 and 4 for yawing and probabilistic network indicating that turbines 4, 5 and 7 are candidates for yawing. As such, turbine 4 is common to both outputs. Further, the CFD model may be used in simulation mode to determine the AEP when yawing turbine 4. Other potential combinations of turbines may be considered. In one or some embodiments, each potential combinations of turbines includes at least the common turbine(s) and other non-common turbines. In the given example, the potential combinations may include turbines 4 and 5, turbines 4 and 7, and turbines 4, 5 and 7. In practice, each potential combination may be inputted to the CFD model in simulation mode to determine the corresponding AEP, which may then be compared with the AEP for the common turbine(s), with the combination having the highest AEP selected for yawing. In the given example, if the AEP determined for turbines 4 and 7 is the highest (being greater than the AEP for turbine 4 alone), turbines 4 and 7 are selected for yawing. After which, at 470, the yaw angles are selected for the turbine(s) to be yawed.

If at 460, there are no common turbines, at 475, operation is modified in order to force one or both of the probabilistic network or the CFD model to output at least one common turbine. After which, at 480, the yaw angles for the at least one common turbine to be yawed are selected. In effect, the system generates an artificially-induced commonality (e.g., in which operational constraints take precedence over performance constraints or vice-versa) with one or more factors being used to determine the artificially-induced commonality (e.g., one or both of the smallest change possible to artificially induce the commonality, such a change with respect to only one turbine and/or AEP maximization and/or yaw constraints (e.g., at least 2 degrees of yaw)). As discussed above, the CFD model outputs the list of turbines, from a performance standpoint, that should be yawed. Similarly, the probabilistic network outputs the states of the turbines that indicate the turbines that can be yawed. Modifying the operation at 475 may result in the outputs of the CFD model being changed and/or the outputs (or the interpretation of the outputs) of the probabilistic network being changed.

As one example, modifying the outputs of the probabilistic network may comprise forcibly changing a state of one or more of the turbines and/or changing the interpretation of the state of one or more of the turbines. In the example given above with turbines 1-7, the CFD model may indicate that turbines 3 and 4 are candidates for yawing and the probabilistic network may indicate that turbines 5-7 have a state that indicates the turbines may be yawed (e.g., higher probability of waking and lower probabilities of going offline, under-performing, or being derated). In such an instance, there are no common turbines in the outputs. As such, in one example, the states (as determined by the probabilistic network) of one or both of turbines 3 or 4 may be forcibly changed (e.g., turbine 3, as determined by the probabilistic network, has a high probability of being subject to maintenance; the system may actively indicate that the maintenance for turbine 3 will be delayed, resulting in the state of turbine 3 being changed, and therefore a candidate for yawing). In another example, the interpretation of the states may be changed (e.g., turbine 3, as determined by the probabilistic network, has a high probability of being derated; the system may change the interpretation of turbine 3, indicating that even though turbine 3 is operating at reduced capacity and typically not a candidate for yawing; in order to achieve a common turbine, the system will re-interpret the output of the probabilistic network for turbine 3 to consider it a candidate for yawing). In either instance, a simulation model (such as the CFD model in simulation mode) may be used to estimate the AEP and the yaw angle for the sensed wind speed and wind direction.

As still another example, modifying the outputs of the probabilistic network may comprise rejecting the turbine(s) as output from the CFD model (with the turbine(s) selected by the CFD model for optimal performance) and selecting one or more turbines that the CFD model did not recommended for yawing for optimal performance.

Figure 5:
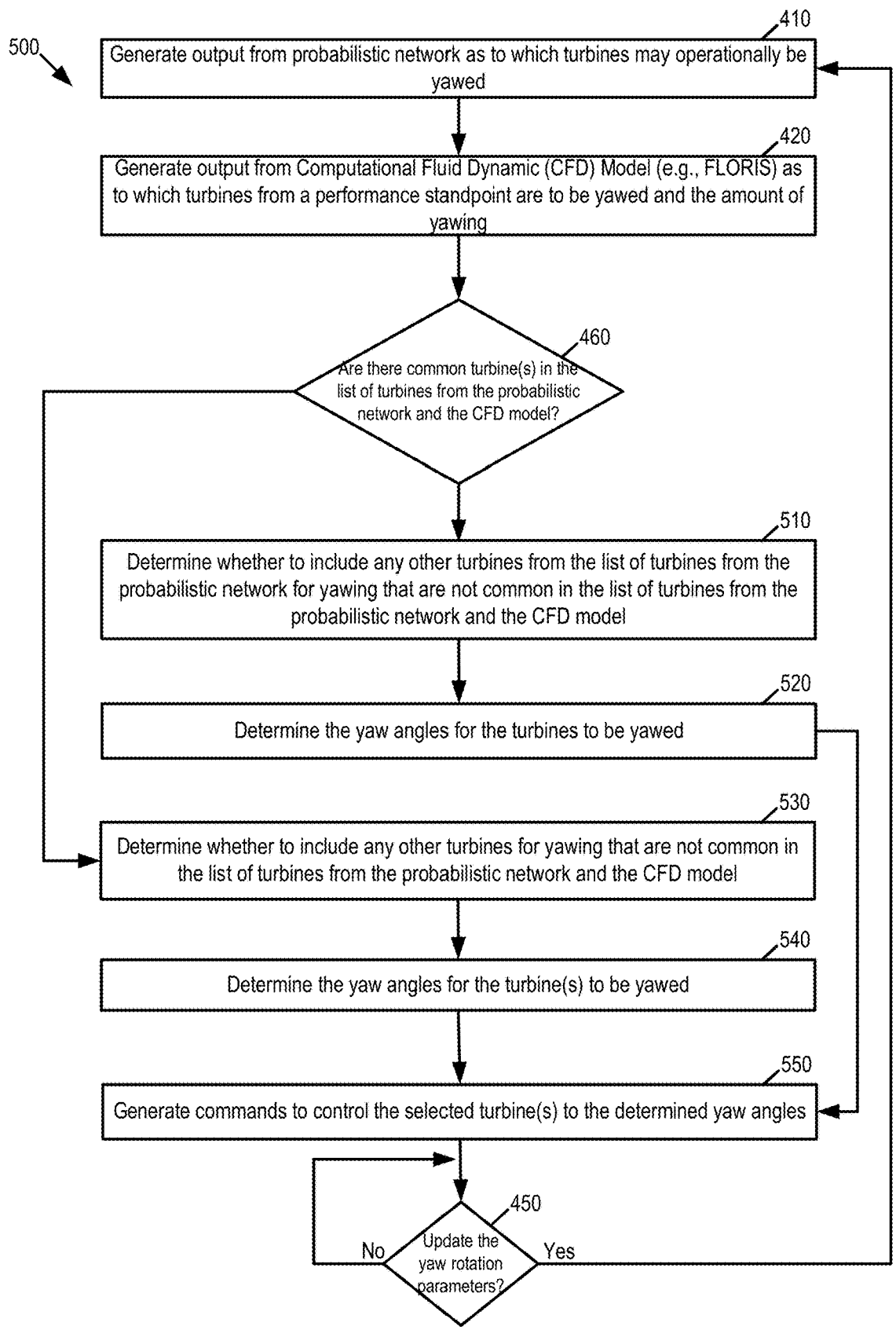
FIG. 5 is a second flow diagram of generating outputs from the probabilistic network and the CFD model and reconciling the outputs in order to control the wind turbines.

FIG. 5 is a second flow diagram 500 of generating outputs from the probabilistic network and the CFD model and reconciling the outputs in order to control the wind turbines. The second flow diagram 500 includes additional detail responsive to determining whether there are common turbine(s) in the list of turbines from the probabilistic network and the CFD model. Specifically, in the event that there are common turbine(s), at 510, it is determined whether to include (in addition to the common turbine(s)) any other turbines for yawing from the list of turbines generated by the probabilistic network that are not common with the list generated by the CFD model. At 520, the yaw angles are determined for those turbines selected to be yawed. As discussed above, the CFD model generates the list of turbines for optimal performance whereas the probabilistic network determines the probabilistic state of the turbines, with the probabilistic state indicating whether a respective turbine is a candidate for yawing. In one or some embodiments, it is assumed that selecting the common turbine(s) (which may be a subset of the list of turbines generated by the CFD model) will result in suboptimal performance as compared to using the entire list of turbines generated by the CFD model. Further, it may be assumed that other potential turbines for yawing, not on the list of turbines generated by the CFD model but on the list generated by the probabilistic network (whose probabilistic state indicates being a candidate for yawing), may potentially improve operation over only those common turbine(s). As such, the system may cycle through some or each of the potential combinations of the common turbine(s) and the potential turbines to determine the AEP, with the potential combination with the highest AEP being selected. For example, a model, such as the CFD model, may be used as a simulator in order to determine the AEP expected for a respective potential combination of turbines.

Further, in the event that there are no common turbine(s), at 530, it is determined whether to include turbine(s) for yawing, such as considering the turbine(s) recommended by the CFD model and/or the probabilistic model. At 540, the yaw angles are determined for the turbine(s) selected to be yawed at 530. In one or some embodiments, the outputs of the probabilistic network indicative of wake steering are only considered. Alternatively, the outputs of the CFD model selected for wake steering are only considered. Still alternatively, both the outputs of the probabilistic network and the CFD model are considered. Thus, simulation may be performed to determine the AEP for the turbine(s) considered, with the highest AEP selected. In one or some embodiments, solely AEP is used to determine which turbine(s) to select. Alternatively, other criteria instead of (or in addition to) AEP is considered. For example, in the event that the simulation indicates that the yaw angle is less than 2 degrees, such a change may be considered infeasible and potentially not resulting in a measurable impact. As such different turbines or combinations of turbines for simulation may be considered. At 550, the commands are generated to control the selected turbine(s) to the determined yaw angles. As discussed above, the PLC code generator 124 may generate the commands to control the turbine controller(s) 130.

For example, one or more turbines output from the CFD model may not be included in the turbine(s) output from the probabilistic network that are interpreted as candidates for yawing. Likewise, one or more turbines output from the probabilistic network that are interpreted as candidates for yawing may not be included in the turbine(s) output from the CFD model. In one or some embodiments, turbine(s) output by one of the probabilistic network or the CFD model but not output by the other of the probabilistic network or the CFD model are considered. In one or some embodiments, a smallest change (e.g., a change to one turbine) is implemented to force commonality. As one example, an operational change may be made to one of the turbines. In particular, the operation of a respective turbine, which was output as one of the turbines by the CFD model as a candidate for yawing but whose probability as generated by the probabilistic network as not being a candidate from an operational standpoint for yawing, may be changed. Changes may include delaying maintenance or the like, resulting in the respective turbine from an operational standpoint being a more feasible candidate for yawing. As another example, the system may reinterpret or reexamine the turbines initially considered unfeasible for yawing. In a first particular instance, the system may select a turbine that was initially deemed by the CFD as not for yawing because of performance reasons but deemed by the probabilistic network for yawing for operational purposes. In a second particular instance, the system may select a turbine that was deemed by the CFD for yawing because of performance reasons but deemed by the probabilistic network as not for yawing for operational purposes. In either instance, to force a commonality, the system selects a turbine that was deemed by either the CFD or by the probabilistic network as not worthy of yawing.

Figure 6:
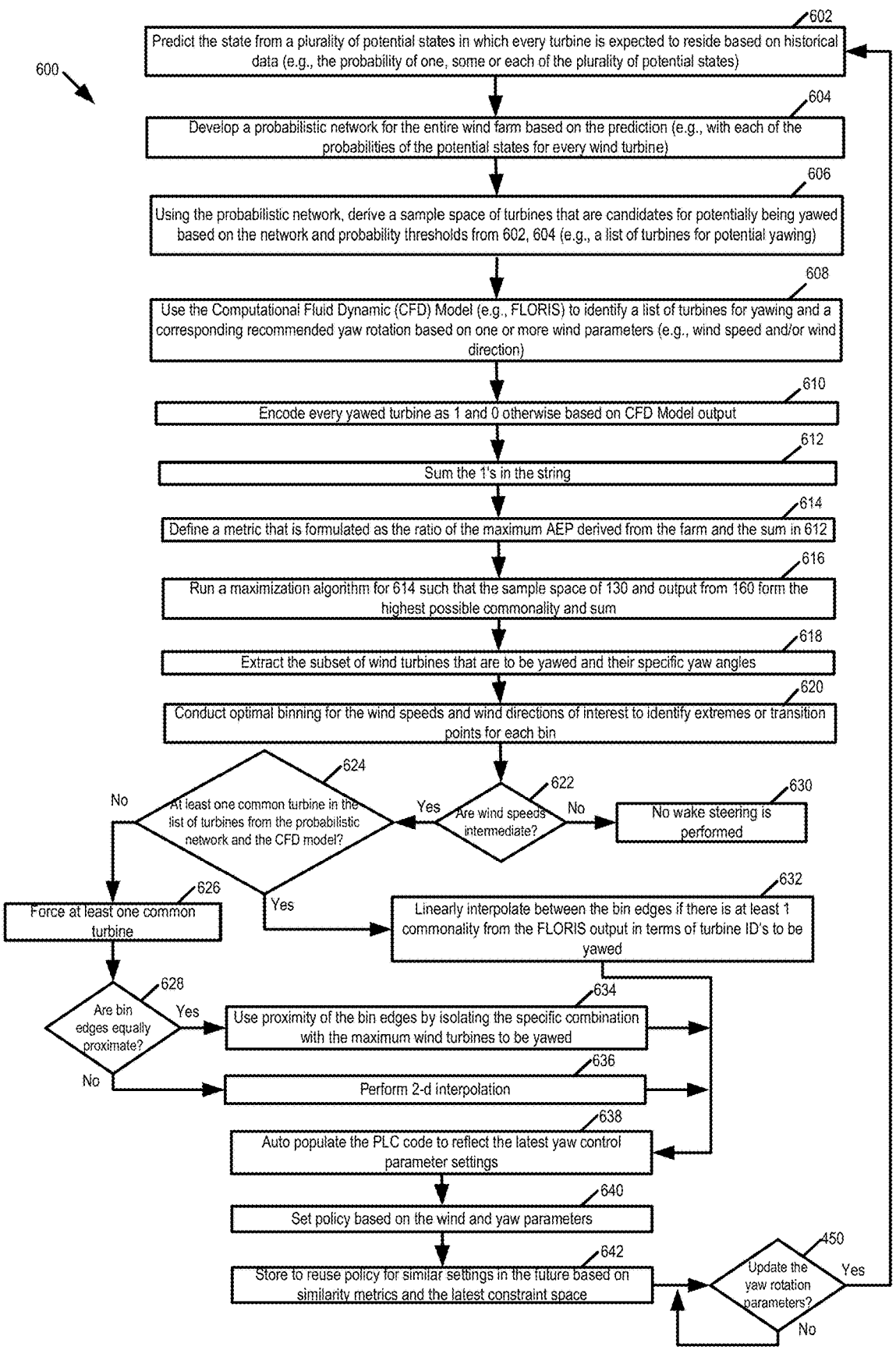
FIG. 6 is a third flow diagram of generating outputs from the probabilistic network and the CFD model and reconciling the outputs in order to control the wind turbines.

FIG. 6 is a third flow diagram 600 of generating outputs from the probabilistic network and the CFD model and reconciling the outputs in order to control the wind turbines. At 602, the probabilistic network predicts the state in which one, some or every turbine in the wind farm is expected to reside based on historical data. For example, the probability may be generated for any one, any combination, or all of: being waked; going offline; under-performing; or being derated. In one or some embodiments, a respective turbine may have associated probabilities for more than one state. For example, a respective turbine may have associated probabilities for each of being waked, going offline, under-performing, and being derated. In practice, a single probability may be dominant. As such, in one or some embodiments, the respective turbine may have a single associated probability (selected for the dominant probability). Alternatively, more than one probability may be considered in determining whether a respective turbine is a candidate for wake steering. Further, one or more states may be considered operationally driven (e.g., the states of offline, under-performing, and being derated) whereas one or more states may be considered performance driven (e.g., being waked).

In this regard, the operationally dependent probability(ies) may change at a different pace (e.g., weekly) versus the performance drive probability(ies) (e.g., hourly or daily). As such, in one or some embodiments, the probabilities for different states may be determined corresponding to different time periods (e.g., weekly for probabilities associated with going offline, under-performing, or being derated versus hourly or daily for being waked).

At 604, a probabilistic network is developed for the entire wind farm based on the prediction (e.g., with each of the probabilities of the potential states for every wind turbine). At 606, using the probabilistic network developed at 604, a sample space of turbines is derived that are candidates for potentially being yawed based on the network and probability thresholds from 602, 604 (e.g., a list of turbines for potential yawing). For example, one or more probability thresholds may be used to determine whether a respective turbine will be waked (e.g., the probability for the respective turbine of being waked is higher than 60%). In this regard, 602, 604, and 606 are associated with the probabilistic network.

At 608, the Computational Fluid Dynamic (CFD) Model (e.g., FLORIS) is used to identify a list of turbines for yawing and a corresponding recommended yaw rotation based on one or more wind parameters (e.g., wind speed and/or wind direction). At 610, every yawed turbine is encoded as a "1" (indicative of the CFD model recommending waking) and "0" (indicative of the CFD model not recommending waking) otherwise based on CFD Model output. At 612, the 1's in the string generated at 610 are summed. At 614, a metric is defined that is formulated as the ratio of the maximum AEP derived from the farm and the sum in 612. Various metrics are contemplated, with the ratio in the metric defined at 614 being merely one example. Other metrics are contemplated. At 616, a maximization algorithm is executed for 614 such that the sample space of 606 and output from 612 form the highest possible commonality and is summed. In this regard, the encoding of the recommended yawed turbines at 610, creating a string of 1's at 612, and the metric at 614 are merely for purposes of determining the commonality via the maximization algorithm at 616. Methodologies other than the maximization algorithm for determining the commonality are contemplated. Further, in most instances, the maximization algorithm may find at least one common turbine between the output of the probabilistic network and the CFD model. However, there are instances where in the initial instance, a common turbine cannot be found. As such, the system may perform one or more operations in order to obtain the common turbine(s), as discussed further below. It is further noted that the sequence of generating the output of the probabilistic network and the CFD model illustrated in FIG. 6 is merely for illustration purposes. Alternatively, generating the outputs may be performed concurrently or sequentially (with the CFD model first generating its outputs).

At 618, the sub-set of wind turbines that are to be yawed and their specific yaw angles are extracted. At 620, for the extracted subset, optimal binning is conducted for the wind speeds and wind directions of interest to identify extremes or transition points for each bin. In one or some embodiments, binning may be used whereby wind speeds and/or wind directions may be defined in terms of bins. In one or some embodiments, measurement of wind direction may part of the wind rose, with the bins indicating which the direction where the wind is coming from (e.g., south, southwesterly, northerly, etc.). The associated bin may indicate a characteristic of the wind (e.g., northerly indicating a higher energy wind). It is further noted that wind speeds less than 3 m/s may not benefit from wake steering, whereas winds speeds greater than 18 m/s may cause damage to the turbines. As such, derating may be performed at a predetermined wind speed (e.g., wind speeds greater than 12 m/s trigger the derating process).

At 622, it is determined whether the wind speed is intermediate. Higher wind speeds (e.g., greater than 18 m/s) may damage the wind turbines. As such, in the event of higher wind speeds, at 630, no wake steering is performed. In particular, in the instance where the wind speed is at a certain threshold beyond which may damage the turbines, the turbines are derated. Further, since the wind turbine is already at maximum producing power (without causing damage), wake steering may not increase the power produced. In that regard, wake steering is not performed. Further, it is noted that the threshold at which to derate may depend on the specifics of the turbine, such as dependent on the size of the rotors, and the like. As such, in a wind farm site, different turbines may have different corresponding thresholds for derating.

Generally speaking, after the common turbines are found (either based on an initial determination of at least one common turbine (see 624) or based on forcing at least one common turbine (see 626)), the yaw angles may be determined. Various methodologies are contemplated for determining the amount of yaw. Merely for purposes of example, interpolation may be used to determine the yaw angles. For example, in one or some embodiments, the wind direction and/or wind speed may be used to select the bins (e.g., a range of the wind speed and/or a range of the wind direction is used to select the bins). After which, the actual wind speed and/or wind direction (e.g., not the ranges but the specific wind speed value and the specific wind direction value) are used to perform the interpolation. As discussed further below, in the event that the wind speed and wind direction are exactly or approximately (e.g., no more than 10%) within the middle of the range of the selected bin (e.g., equidistant from the bin edges), a linear interpolation is performed. Alternatively, in the event that the wind speed and wind direction are not exactly or approximately (e.g., greater than 10%) within the middle of the range of the selected bin, interpolation may still be performed. In one embodiment, linear interpolation is still performed. Alternatively, a different type of interpolation is performed.

In particular, interpolation may be performed to determine the prescribed yaw angle based on outputs from 618 and 620 under certain conditions, such as whether there is an initial commonality (see 624) and/or whether there is a forced commonality (see 626). Further, in one or some embodiments, a minimum yaw angle may comprise a criterion (in addition to AEP) to determine whether a potential turbine (or combination of turbines) is feasible for yawing. As discussed above, yaw angles less than 2 degrees may have little to no measurable impact. As such, a potential turbine (or combination of turbines) with a recommended yaw angle less than 2 degrees may be rejected for yawing.

Referring back to FIG. 6, if the wind speeds are intermediate, at 624, the system determines whether there is at least one common turbine in the list of turbines from the probabilistic network for yawing and the CFD model for yawing. If so, at 632, linear interpolation is performed between the bin edges. If there are no common turbines at 624, at 626, operations are performed to force at least one common turbine, as discussed above.

Merely by way of example, the CFD model 160 may output turbines 1, 2, and 3 for yawing and the probabilistic network 170 may output turbines 4, 5, and 6 for yawing. As shown, no common turbine between the outputs is present. Various combinations of turbines to force a commonality may be examined, such as to determine the AEP (e.g., the CFD model 160 may operate in simulation mode using the different combinations to estimate the AEP), with the specific combination having the highest AEP being selected. In one or some embodiments, the methodology seeks the smallest number of wind turbines to yaw for the highest AEP gained. More specifically, some or all of the potential combinations may be examined In the present example, in one iteration, a single turbine is selected from the output of the probabilistic network 170 for examination (e.g., selecting turbine 4, the following combinations are examined for AEP: (1, 2, 4), (2, 3, 4), and (1, 3, 4); selecting turbine 5, the following combinations are examined for AEP: (1, 2, 5), (2, 3, 5), and (1, 3, 5); selecting turbine 6, the following combinations are examined for AEP: (1, 2, 6), (2, 3, 6), and (1, 3, 6)). In addition or alternatively, another iteration may be performed in which two turbines are selected from the output of the probabilistic network 170 for examination (e.g., combinations of (1, 2), (1, 3), (2, 3) with combinations of (4, 5), (4, 6), (5, 6)). In one or some embodiments, the ML model 180 may perform this some or all of this analysis to determine the turbine(s) to select for the commonality.

Further, once common turbine(s) are forced and binned, at 628, it is determined whether the bin edges are equally proximate (e.g., a respective bin has edges of 2 m/s and 4 m/s; if the current wind speed is 3 m/s, the bin edges are equally proximate) or substantially equally proximate (e.g., within 10% of being equally proximate). If the bin edges are not equally proximate, at 636, 2-D interpolation is performed. In one or some embodiments, the interpolation in 634 is identical to the interpolation in 636. Alternatively, the interpolations performed are different. After which, at 638, the PLC code (which may be generated by PLC code generator 124) may be auto-populated to reflect the latest yaw control parameter settings, as discussed above.

Another example includes a wind speed of 5.7 and a wind direction of 179, both of which may be input to the binning algorithm. Input to the CFD Model 160 may include ranges for both the wind speed and the wind direction. In particular, the input to the CFD Model 160 may comprise a wind speed between 3-11 and a wind direction between 160-180 degrees. Moreover, the wind speed and wind direction may be used to determine the bin, which may have been determined previously, such as by the ML Model 180. One bin includes a range of 5.62 to 5.84 and a speed of 178.91 to 179.96. After selecting the appropriate bin, 2-D interpolation may be performed in both the wind speed and the wind direction.

Further, at 640, the policy may be set based on the wind and yaw parameters, and at 642, the policy may be stored for future reuse for similar settings based on similar metrics and the latest constraint space. Thus, setting policy and reusing the policy may take advantage of the previous computational analysis. In practice, the particulars (e.g., the particular day, the particular wind speed (such as in a particular range), the particular wind direction (such as in a particular range), the particular wind turbines to be yawed, and the particular yaw angle(s) assigned to each) may be stored as a policy. In this way, the stored policy may be used for reference in the event that similar particulars are encountered. Thus, if faced in future operation with the same constraints or similar constraints (e.g., within a predetermined percentage), such as the same or similar derating(s), offline status(es), yawing, and the same or similar wind conditions (e.g., the same or similar wind direction and wind speed), the policy may be used for control of the wind farm. In one or some embodiments, the policies may be stored as a look-up table.

Finally, at 450, flow diagram 600 may determine whether to loop back to 602 responsive to determining to update the yaw rotation parameters. As discussed above, various triggers may be used to determine whether to reevaluate the yaw rotation parameters. In one or some embodiments, the trigger may be based on operations, such as whether a turbine is scheduled to go offline for maintenance and/or whether a turbine will be derated (e.g., due to wind speeds greater than 18 m/s). In one or some embodiments, the trigger may be based on the probabilistic network in which the probabilistic network indicates a change (e.g., an increase or a decrease) in the status of one, some, or all of the turbines in one or more states (e.g., an increase or a decrease in the probability of offline status and/or in derating status). In this regard, in one or some embodiments, the trigger may be dynamic (e.g., dependent on operational concerns). Alternatively, the trigger may be periodic, such as daily or weekly.

Thus, FIG. 6 illustrates multiple layers of intelligence including any one, any combination, or all of: (1) state identification (as performed by the probabilistic network); (2) harmonizing the outputs of the CFD model and Bayesian network (e.g., determining commonalities); (3) identifying potential turbines or potential combinations of turbines to evaluate for potential yawing (e.g., if 6 turbines within a 12 turbine farm match, determining what are the other combinations to consider and simulating the other combinations to determine the estimated AEP in order to determine the highest AEP); (4) in the event of non-commonality, determining a change (such as a smallest change) to make to create a commonality; and (5) determining whether the change is actually feasible (e.g., whether the recommended yaw is greater than 2 degrees).

Figure 7:
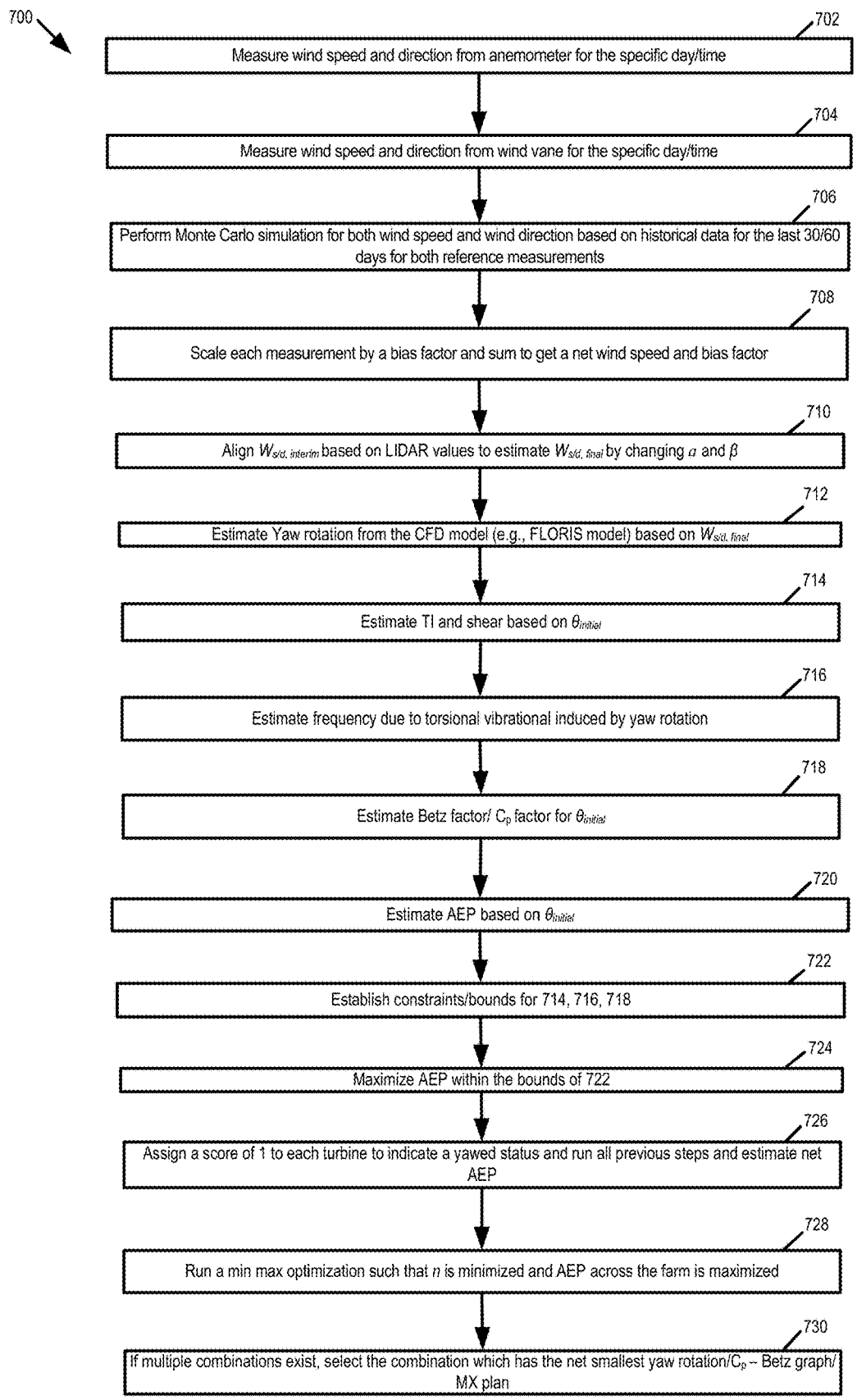
FIG. 7 is a fourth flow diagram of generating outputs from the probabilistic network and the CFD model and reconciling the outputs in order to control the wind turbines.

FIG. 7 is a fourth flow diagram 700 of generating outputs from the probabilistic network and the CFD model and reconciling the outputs in order to control the wind turbines. One or more measurements may be performed, such as any one, any combination, or all of 702, 704, 706, 708, 710. In particular, at 702, wind speed and direction are measured from an anemometer for the specific day/time. At 704, wind speed and direction may be measured from a wind vane for the specific day/time. At 706, a Monte Carlo simulation may be performed for both wind speed and wind direction based on historical data for a certain time period (e.g., the previous 30 or 60 days) for both reference measurements. At 708, each measurement may be scaled by a bias factor and sum to obtain a net wind speed and bias factor. At 710, $W_{s/d, \, interim}$ may be aligned based on LIDAR values to estimate $W_{s/d, \, final}$ by changing a and β.

Further, analysis may be performed based on the measurements. For example, at 712, Yaw rotation from the CFD model (e.g., FLORIS model) may be estimated based on the $W_{s/d, \, final}$ determined at 710. At 714, the turbulence intensity (TI) and shear may be estimated based on $\theta_{initial}$ (e.g., the initial tilt angle of the respective turbine). At 716, frequency due to torsional vibrational induced by yaw rotation may be estimated. Thus, yawing the system may degrade or negatively impact the wind farm. For example, yawing may be performed until harmonics are induced. The expected harmonics may be measured by using TI and shear. In this regard, the methodology disclosed in FIG. 7 may change depending on changes in the TI and shear.

At 718, Betz factor/$C_p$ (coefficient of performance) factor is estimated for $\theta_{initial}$. The Betz's factor is a theoretical maximum efficiency for a wind turbine. Thus, FIG. 7 is not entirely focused on AEP, instead relying on the Betz factor and $C_p$ factor.

At 720, AEP is estimated for a part or all of the wind farm based on $\theta_{initial}$. At 722, constraints/bounds for 714, 716, 718 are established. Merely by way of example, any one, any combination, or all of the following may be established as constraints: amount of TI; amount of shear; frequency due to torsional vibrational induced by yaw rotation; or amount of sacrifice of the Betz factor. In a particular example, tilting may enable more of the wake to be steered; however, by titling more, harmonics may be induced further. The constraints, such as due to harmonics, may in turn limit the amount of wake steering.

At 724, AEP is maximized within the bounds of 722. At 726 (similar to 610), a score of 1 is assigned to each turbine to indicate a yawed status, all previous steps are run and the net AEP is estimated. At 728 (similar to 616), a min-max optimization is run such that n is minimized and AEP across the farm is maximized. At 730, if multiple combinations exist, the combination which has the net smallest yaw rotation/$C_p$—Betz graph/MX plan is selected. Thus, the Betz graph is computed and serves as a guide. Further, the $C_P$ graph is overlaid with the maintenance plan, thereby identifying the commonality between the maintenance plan and the $C_P$ graph. In other words, the maintenance plan may comprise a list of the turbines subject to maintenance. The $C_P$ graph, which is indicative of the Coefficient of Power or Coefficient of Performance (or the Betz graph), indicates the amount of energy. Commonalities of the $C_P$ graph with the maintenance plan indicates a potential problem. As such, a focus is to identify combinations where the commonality is not as high. In this regard, FIGS. 6-7 provide different methodologies to determine a solution, with FIG. 7 illustrating a visual solution and with FIG. 6 illustrating a numerical solution.

Figure 8:
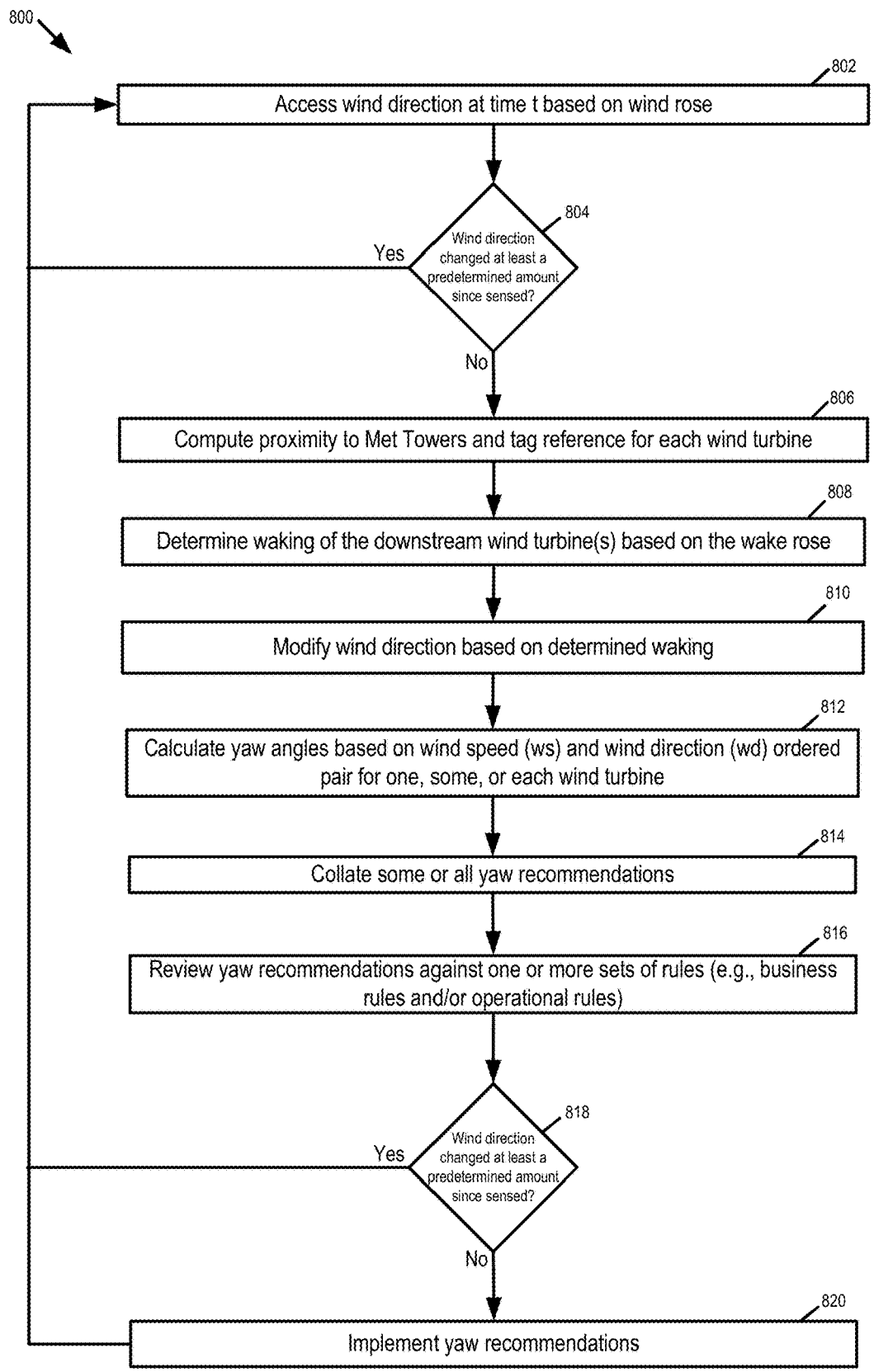
FIG. 8 is a fifth flow diagram of generating and implementing yaw recommendations.

FIG. 8 is a fifth flow diagram 800 of generating and implementing yaw recommendations. Various steps may be performed in order to determine the wind speed and/or wind direction at various wind turbines. For example, Met Towers may be used to determine the wind speed and/or wind direction. Further, because waking may modify the wind speed and/or wind direction, the data generated by the Met Towers may be modified to account for waking. For example, at 802, wind direction at time t is accessed based on the wind rose. For example, data regarding wind speed and/or wind direction may be input.

At 804, it is determined whether the data (e.g., the wind speed and/or wind direction) used for the analysis is stale. Assessment of data staleness may be relevant since computation and/or yaw recommendation may be suspended during staleness time (e.g., a time period in which the data is identified as stale). Detecting staleness in data may be based on a combined statistical and information measure, such as by using rolling variance and active information ("Actl"), spanning a predetermined time window (interchangeably termed a staleness window). Responsive to identifying that the trend line in both measures is "constant or flat" across the predetermined time window, then staleness is deemed to be present. In one or some embodiments, the length of the time window may be optimized based on historical evidence of data staleness and may be a multiple of the granularity of the time series. For instance, if data is measured or recorded in "days", then data staleness may be detected, validated, and informed to the operations time also in the same time scale. Thus, the length of the staleness window may be an optimal value derived from an optimization routine, which may minimize false positives. Hence $F_\beta$ score may be used where $\beta<1$, thereby giving preference to precision or reduction of false positives.

For example, if flatness is viewed as confirmed by both coefficient values (e.g., one for Actl and another for Variance)<0.001 (an example of a tolerance limit, which may be different for each metric): in a time window (e.g., length) of X number of hours, such as 5 hours (an example of the granularity), when wind speed/wind direction (whereby each may have its own threshold limits for each metric) may be measured every X number of minutes, such as 10 minutes (e.g., sample rate), then computation may be restricted as it is indicative of data staleness.

At 806, proximity to Met Tower(s) is computed and tag reference for each wind turbine. For example, for a respective wind turbine, the wind speed and/or wind direction may be determined based on the closest, from a distance standpoint), (or two closest) Met Towers to the respective wind turbine. At 808, waking of one or more downstream wind turbine(s) may be determined, such as based on the wake rose. For example, the methodology may establish the binary condition for each downstream wind turbine (e.g., whether waked or not waked).

After which, the wind speed and/or wind direction may be modified based on the waking. For example, at 810, wind direction may be modified based on the determined waking. More specifically, if it is determined that the respective wind turbine is not waked, the sensed wind speed and wind direction (e.g., determined by the closest Met Tower(s)) is used unmodified. If it is determined that the respective wind turbine is waked, the sensed wind speed and/or wind direction is modified. Modifying the wind speed and/or wind direction due to waking may be performed in one of several ways. In one way, the sensed wind speed and/or wind direction may be modified by a loss factor. By way of example, the loss factor may be multiplied dependent on the number of layers of upstream wind turbines the wind navigates until reaching the respective turbine at issue. In particular, it may be assumed that at each layer, the wind speed and/or wind direction may be affected by the loss factor. As such, in one or some embodiments, the loss factor may be multiplied by the number of layers, and thereafter used on the originally sensed wind speed and/or direction in order to calculate the wind speed and/or wind direction (thereby accounting for waking at the various layers).

By way of example, the reduction of the initial wind speed ($U_0$) and the actual velocity at the respective wind turbine (V) may be calculated by coefficient ($C_t$) according to the following:

$$(1-C_t)=(V/U_0)^2,$$

where the wake effect decay constant (e.g., the loss factor) may have a default value of k=0.075.

Alternatively, the wind speed and/or wind direction may be determined based on a wind speed and/or wind direction sensor resident at the respective turbine. Still alternatively, the wind speed and/or wind direction may be determined based on both the Met Towers (modified by the loss factor) and the sensors resident at the respective turbine.

After which, at 812, yaw recommendations, such as yaw angles, may be calculated based on the wind speed (ws)/wind direction (wd) ordered pair for one, some, or each wind turbine in the wind farm.

At 814, the yaw recommendations may be collated. At 816, yaw recommendations may be reviewed against one or more sets of rules (e.g., business rules and/or operational rules). As discussed above, one or more factors may comprise hard limits (which may be used to eliminate consideration of permutations of yaw recommendations) or may comprise soft limits (which may be used to penalize, but not eliminate, considerations of permutations of yaw recommendations). In this regard, employing the soft limits may increase the potential solutions to consider in determining the highest total AEP gain balanced with operational health of the wind turbines. Thus, in one embodiment, hard limits may be used. Alternatively, soft limits may be used. Still alternatively, certain factor(s) may be used as hard limits and other factor(s) may be used as soft limits.

As one example, one factor may comprise the number of times a respective wind turbine has been yawed within a predetermined time period (e.g., within the past six hours; within the past twelve hours; within the past twenty-four hours; etc.). In one embodiment, this factor may comprise a hard limit, in that when the respective turbine, when having been yawed greater than the number of times in the predetermined time period, is excluded from further yawing. Alternatively, the factor may comprise a soft limit, in that the factor may be temporarily relaxed (e.g., a limit of 5 yaws in the last six hours may be relaxed to allow 6 yaws).

Further, in one or some embodiments, collation may comprise considering (and optionally ranking or prioritizing) one, some or each potential permutation (e.g., every allowable permutation and/or partially allowable permutation (such as a permutation that is considered feasible even though it may violate a soft limit)). As discussed above, the analysis may comprise using a multi-armed bandit methodology. In one or some embodiments, the permutations may be ranked from highest to lowest AEP. Further, in one implementation, an operator may review suggested yaw recommendation(s) in order to accept a yaw recommendation or reject a yaw recommendation (effectively accepting a lower AEP because accepting the yaw recommendation may potentially lead to higher maintenance costs). For example, a respective turbine, which is currently yawed at 13.5°, may have a suggested yaw recommendation of 14.5°, which is still lower than the 15° imposed limit as discussed above. In such an instance, the operator may reject the recommendation, choose another yaw recommendation (or suggest another yaw recommendation), and provide a reason for the rejection, as discussed above.

Thus, the methodology may attempt to identify the global optimum from analysis of the various permutations, or may identify a local optimum. As stated previously, the imposition of the various factors may make it more difficult to identify the optimum, whether global or local. Thus, the methodology may, in one or some embodiments, relax the constraints for certain factors and strictly impose the constraints for other factors in order to balance efficiency and health of the wind turbines.

Prior to implementing the yaw recommendations, at 818, the methodology may determine whether the wind direction has changed by at least a predetermined amount since sensed (e.g., the data at 802). If so (meaning that the wind direction has changed sufficiently to re-execute the analysis and not implement the yaw recommendations), flow diagram 800 loops back to 802 in order to repeat the calculations.

If the wind speed/wind direction has not changed, at 820, the yaw recommendations are implemented (e.g., by transmitting them to the automation device 230 or to automatically implement them). After which, flow diagram 800 may loop back to 802 to begin the process again.

Thus, in the event that in the time to compute the recommended yaw angles, the wind speed and/or the wind direction has changed more than a predetermined amount (e.g., greater than 2% deviation), then the recommended yaw angles are not implemented and the analysis is performed again with the updated wind speed and/or wind direction.

Figure 9:
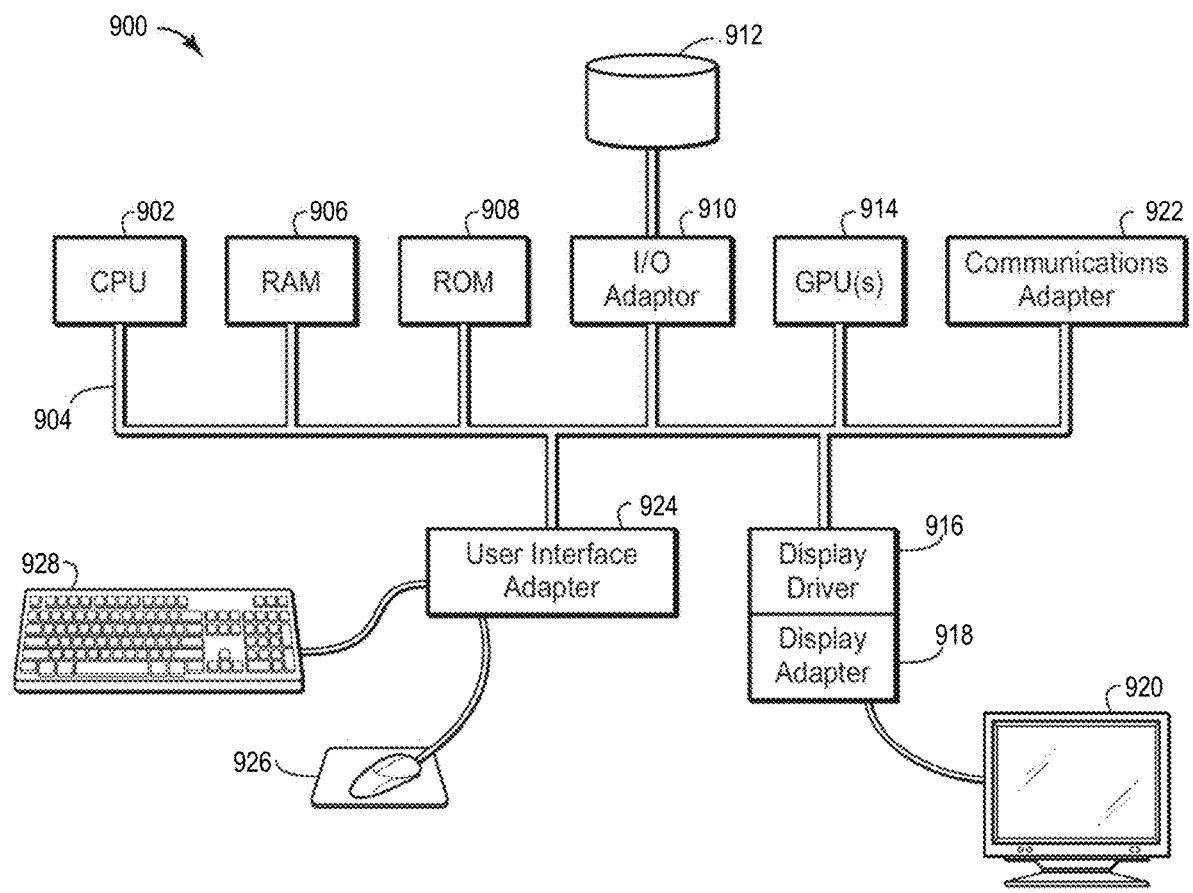
FIG. 9 is a diagram of an exemplary computer system that may be utilized to implement the methods described herein.

In all practical applications, the present technological advancement must be used in conjunction with a computer, programmed in accordance with the disclosures herein. Merely by way of example, various devices disclosed in the present application may comprise a computer or may work in combination with a computer (e.g., executed by a computer), such as any one, any combination, or all of turbine management system 120, wake steering system 122, PLC code generator 124, turbine controller(s) 130, CFD model 160, ML model 180, virtual machine 210, automation device 274, operator check device 276, or logging device 278, etc. Merely by way of example, FIG. 9 is a diagram of an exemplary computer system 900 that may be utilized to implement methods, including the flow diagrams, described herein. A central processing unit (CPU) 902 is coupled to system bus 904. The CPU 902 may be any general-purpose CPU, although other types of architectures of CPU 902 (or other components of exemplary computer system 900) may be used as long as CPU 902 (and other components of computer system 900) supports the operations as described herein. Those of ordinary skill in the art will appreciate that, while only a single CPU 902 is shown in FIG. 9, additional CPUs may be present. Moreover, the computer system 900 may comprise a networked, multi-processor computer system that may include a hybrid parallel CPU/GPU system. The CPU 902 may execute the various logical instructions according to various teachings disclosed herein. For example, the CPU 902 may execute machine-level instructions for performing processing according to the operational flow described herein, such as FIGS. 4A-8.

The computer system 900 may also include computer components such as non-transitory, computer-readable media. Examples of computer-readable media include computer-readable non-transitory storage media, such as a random-access memory (RAM) 906, which may be SRAM, DRAM, SDRAM, or the like. The computer system 900 may also include additional non-transitory, computer-readable storage media such as a read-only memory (ROM) 908, which may be PROM, EPROM, EEPROM, or the like. RAM 906 and ROM 908 hold user and system data and programs, as is known in the art. In this regard, computer-readable media may comprise executable instructions to perform any one, any combination, or all of the blocks in the flow charts in FIGS. 3-7. The computer system 900 may also include an input/output (I/O) adapter 910, a graphics processing unit (GPU) 914, a communications adapter 922, a user interface adapter 924, a display driver 916, and a display adapter 918.

The I/O adapter 910 may connect additional non-transitory, computer-readable media such as storage device(s) 912, including, for example, a hard drive, a compact disc (CD) drive, a floppy disk drive, a tape drive, and the like to computer system 900. The storage device(s) may be used when RAM 906 is insufficient for the memory requirements associated with storing data for operations of the present techniques. The data storage of the computer system 900 may be used for storing information and/or other data used or generated as disclosed herein. For example, storage device(s) 912 may be used to store configuration information or additional plug-ins in accordance with the present techniques. Further, user interface adapter 924 couples user input devices, such as a keyboard 928, a pointing device 926 and/or output devices to the computer system 900. The display adapter 918 is driven by the CPU 902 to control the display on a display device 920 to, for example, present information to the user such as images generated according to methods described herein.

The architecture of computer system 900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 900 may include various plug-ins and library files. Input data may additionally include configuration information.

In one or some embodiments, any one, any combination, or all of the various actions, such as illustrated in the flow diagrams in FIGS. 4A-B and 5-8, described with the block diagrams in 1A-B, 2, 3B, or 9, or generally described above, may be performed automatically. Alternatively, any one, any combination, or all of the various actions, such as illustrated in the flow diagrams in FIGS. 4A-B and 5-8, described with the block diagrams in 1A-B, 2, 3B, or 9, or generally described above, may be performed manually. Still alternatively, any one, any combination, or all of the various actions, such as illustrated in the flow diagrams in FIGS. 4A-B and 5-8, described with the block diagrams in 1A-B, 2, 3B, or 9, or generally described above, may be performed at least partly automatically and at least partly manually. Merely by way of example, with regard to control, the generation of the yaw recommendation (e.g., selection of the turbine(s) for yawing and the amount of yaw) may be generated automatically, and automatically output to an operator for manual approval/rejection (e.g., the operator provides manual approval or manual rejection of the yaw recommendation via a touchscreen input). After which (e.g., after manual approval), the system may automatically implement the yaw recommendations. In this regard, any of the various actions may be performed at least partly manually and at least partly automatically. Alternatively, with regard to control, the entire process may be performed automatically, including generation of the yaw recommendation (e.g., selection of the turbine(s) for yawing and the amount of yaw) and automatically implementation of the yaw recommendation (e.g., without the need for any operator input). In this regard, different combinations of the various actions are contemplated, such as an entirely automatic set of actions (without any manual actions), such as certain actions being automatically performed and other actions being manually performed, or such as certain actions being automatically performed and/or other actions being partly automatic/partly manual performed and/or still other actions being manually performed.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting models discussed herein may be downloaded or saved to computer storage.

The following example embodiments of the invention are also disclosed:

Embodiment 1

A computer-implemented method for wake steering of wind turbines in a wind farm, the method comprising:
automatically sensing one or more aspects of wind;
automatically generating, using at least one model configured to analyze both operational state and operational health of one or more wind turbines in the wind farm, recommended yaw control for the one or more wind turbines in order to increase power generated by the one or more wind turbines; and
controlling, using the recommended yaw control, the wind farm for wake steering.

Embodiment 2

The method of embodiment 1: wherein the at least one model generates the recommended yaw control for the one or more wind turbines by analyzing a plurality of factors that dynamically balances efficiency of power generated by the one or more wind turbines and the operational health of the one or more wind turbines.

Embodiment 3

The method of embodiments 1 or 2: wherein the at least one model dynamically balances the efficiency of power generated by the one or more wind turbines and the operational health of the one or more wind turbines based on both a current sensing of the one or more aspects of the wind and on a current state of the one or more wind turbines.

Embodiment 4

The method of any of embodiments 1-3: wherein the plurality of factors comprise one or more factors of the one or more wind turbines independent of yaw steering and one or more factors of the one or more wind turbines dependent on the yaw steering.

Embodiment 5

The method of any of embodiments 1-4: wherein the one or more factors, for a respective wind turbine, independent of the yaw steering comprise one or more of: being waked; being offline; under-performing; or being derated; and
wherein the one or more factors, for the respective wind turbine, dependent of the yaw steering comprise one or more of: number of yaw steers performed for the respective wind turbine in a predetermined period; extent of yaw angle change for the respective wind turbine; or limit as to yaw angle change for the respective wind turbine.

Embodiment 6

The method of any of embodiments 1-5: wherein at least one factor is used to exclude one or more potential yaw steering permutations; and
wherein the at least one model is configured to analyze one or more remaining yaw steering permutations to dynamically balance the efficiency of power generated by the one or more wind turbines and the operational health of the one or more wind turbines.

Embodiment 7

The method of any of embodiments 1-6: wherein the at least one model analyzes the one or more remaining yaw steering permutations according to a multi-armed bandit problem.

Embodiment 8

The method of any of embodiments 1-7: wherein the one or more factors comprises an indication of being waked; and
wherein the indication of being waked comprises a wake rose.

Embodiment 9

The method of any of embodiments 1-8: wherein the wake rose comprises an indication of a region of waking;
wherein an apex of the indication of the region for waking of the wake rose is positioned on at least one upstream turbine; and
wherein one or more downstream turbines within the region are determined to be waked.

Embodiment 10

The method of any of embodiments 1-9: wherein the one or more factors comprises a number of yaw steers in a predetermined time period for a respective wind turbine.

Embodiment 11

The method of any of embodiments 1-10: wherein the one or more factors comprises an amount of change in yaw angle for a respective wind turbine.

Embodiment 12

The method of any of embodiments 1-11: wherein the at least one model comprises:
a computational fluid dynamic (CFD) model used to generate, based on the one or more aspects of wind, operationally-independent recommended control of at least one of the wind turbines in the wind farm; and
a machine-learned (ML) model used to automatically reconcile the operationally-independent recommended control and one or both of the operational state or the operational health to generate operationally-dependent recommended control; and
wherein the recommended yaw control comprises the operationally-dependent recommended control.

Embodiment 13

The method of any of embodiments 1-12: wherein a first computing device generates the recommended yaw control for the one or more wind turbines;
wherein a second computing device controls the wind farm for wake steering, the second computing device comprising an automation platform for sending commands to the one or more wind turbines to modify operation to the recommended yaw control;

wherein the first computing device includes or communicates with a virtual second computing device that virtually mirrors operations of the second computing device;

wherein the first computing device, prior to sending the recommended yaw control to the second computing device, sends the recommended yaw control to the virtual second computing device in order to simulate implementing the recommended yaw control; and wherein the first computing device, based on the simulation implementing the recommended yaw control, determines whether to send the recommended yaw control to the second computing device.

Embodiment 14

The method of any of embodiments 1-13: wherein at least one computing device generates the recommended yaw control for the one or more wind turbines based on a machine-learned model;

wherein at least an operator computing device receives the recommended yaw control for the one or more wind turbines;

wherein an operator, at the at least an operator computing device, accepts or rejects the recommended yaw control for the one or more wind turbines;

wherein, responsive to the operator rejecting the recommended yaw control, the rejection and at least one operator reason for the rejecting of the recommended yaw control is logged in a logging device; and wherein the machine-learned model is further trained based on the rejection of the recommended yaw control and the at least one operator reason for the rejecting of the recommended yaw control.

Embodiment 15

The method of any of embodiments 1-14: wherein the one or more aspects of the wind comprise one or both of wind speed or wind direction;

wherein the one or both of the wind speed or the wind direction are sensed from one or more meteorological (MET) towers;

wherein the one or both of the wind speed or the wind direction are modified based on potential waking; and wherein the modified one or both of the wind speed or the wind direction are used by the at least one model to generate the recommended yaw control.

Embodiment 16 a turbine management system comprising:
a communication interface configured to receive sensed information indicative of one or more aspects of wind; and
a wake steering system in communication with the communication interface, the wake steering system configured to:
generate, using at least one model configured to analyze both operational state and operational health of one or more wind turbines in a wind farm, recommended yaw control for the one or more wind turbines in order to increase power generated by the one or more wind turbines; and control, using the recommended yaw control, the wind farm for wake steering.

Embodiment 17

The method of embodiment 16: wherein the at least one model is configured to generate the recommended yaw control for the one or more wind turbines by analyzing a plurality of factors that dynamically balances efficiency of power generated by the one or more wind turbines and the operational health of the one or more wind turbines.

Embodiment 18

The method of embodiments 16 or 17: wherein the at least one model is configured to dynamically balance the efficiency of power generated by the one or more wind turbines and the operational health of the one or more wind turbines based on both a current sensing of the one or more aspects of the wind and on a current state of the one or more wind turbines.

Embodiment 19

The method of any of embodiments 16-18: wherein the plurality of factors comprise one or more factors of the one or more wind turbines independent of yaw steering and one or more factors of the one or more wind turbines dependent on the yaw steering.

Embodiment 20

The method of any of embodiments 16-19: wherein the one or more factors, for a respective wind turbine, independent of the yaw steering comprise one or more of: being waked; being offline; under-performing; or being derated; and wherein the one or more factors, for the respective wind turbine, dependent of the yaw steering comprise one or more of: number of yaw steers performed for the respective wind turbine in a predetermined period; extent of yaw angle change for the respective wind turbine; or limit as to yaw angle change for the respective wind turbine.

Embodiment 21 computer-implemented method for wake steering of wind turbines in a wind farm, the method comprising:
automatically sensing one or more aspects of wind;
automatically generating, using a computational fluid dynamic (CFD) model and based on the one or more aspects of wind, operationally-independent recommended control of at least one of the wind turbines in the wind farm;
automatically generating, using a probabilistic network, an operational state of one or more of the wind turbines in the wind farm;
automatically reconciling the operationally-independent recommended control and the operational state to generate operationally-dependent recommended control; and
controlling, using the operationally-dependent recommended control, the wind farm for wake steering.

Embodiment 22

The method of embodiment 21: wherein automatically reconciling the operationally-independent recommended control and the operational state to generate operationally-dependent recommended control comprises using a machine-learned (ML) model.

Embodiment 23

The method of embodiments 21 or 22: wherein the CFD model outputs an operationally-independent list of one or more wind turbines to wake steer;
wherein the probabilistic network generates an output indicative of an operationally-dependent list of one or more wind turbines to wake steer;
wherein automatically reconciling comprises automatically determining whether there are one or more common wind turbines in the operationally-independent list and the operationally-dependent list; and
responsive to determining that there are one or more common wind turbines in the operationally-independent list and the operationally-dependent list, controlling at least the one or more common wind turbines for wake steering.

Embodiment 24

The method of any of embodiments 21-23: wherein the operationally-independent list comprises an initial output of the CFD model;
wherein the operationally-dependent list is based on an initial output of the probabilistic network; and
wherein responsive to determining that there are no common wind turbines in the operationally-independent list and the operationally-dependent list, analyzing the wind turbines in one or both of the operationally-independent list or the operationally-dependent list to select for wake steering thereby rejecting at least one of the initial output of the CFD model or the initial output of the probabilistic network.

Embodiment 25

The method of any of embodiments 21-24: wherein analyzing the wind turbines in one or both of the operationally-independent list or the operationally-dependent list to select for wake steering comprises:
analyzing the wind turbines in the operationally-dependent list to select at least one wind turbine in the operationally-dependent list for wake steering with the at least one wind turbine selected not included in the operationally-independent list, thereby rejecting the initial output of the CFD model.

Embodiment 26

The method of any of embodiments 21-25: wherein analyzing the wind turbines in one or both of the operationally-independent list or the operationally-dependent list to select for wake steering comprises analyzing at least one turbine in the operationally-independent list that is not on in the operationally-dependent list; and
wherein automatically reconciling further comprises changing a maintenance schedule of the at least one turbine so that maintenance of the at least one turbine is performed after the wake steering.

Embodiment 27

The method of any of embodiments 21-26: wherein automatically reconciling the operationally-independent recommended control and the operational state to generate operationally-dependent recommended control is independent of one or more manufacturers of the wind turbines.

Embodiment 28

The method of any of embodiments 21-27: wherein automatically reconciling the operationally-independent recommended control and the operational state to generate operationally-dependent recommended control is independent of a location of the wind farm.

Embodiment 29

The method of any of embodiments 21-28: wherein automatically reconciling is independent of whether an adjacent wind farm is creating wakes for the wind farm.

Embodiment 30

The method of any of embodiments 21-29: wherein sensing the one or more aspects of wind comprises sending wind speed and wind direction.

Embodiment 31 a computer-implemented method for wake steering of wind turbines in a wind farm, the method comprising:
automatically sensing one or more aspects of wind;
automatically generating, based on the one or more aspects of wind, an operationally-independent list of one or more wind turbines to wake steer;
automatically generating an output indicative of an operationally-dependent list of one or more wind turbines to wake steer, the operationally-dependent list being dependent on determinations of one or more of being waked, underperforming, or being derated;
automatically analyzing both of the operationally-independent list and the operationally-dependent list;
automatically selecting, based on the analysis, one or more wind turbines for wake steering; and
controlling the one or more wind turbines for wake steering.

Embodiment 32

The method of embodiment 31: wherein the operationally-dependent list is dependent on determinations for at least one turbine of each of being waked, going offline, underperforming, being derated, number of yaws within a predetermined period, and an extent of yaw angle change.

Embodiment 33

The method of embodiments 31 or 32: further comprising automatically generating an indication of a region of waking; and
automatically determining, based on the indication of the region of waking, whether the at least one turbine is being waked.

Embodiment 34

The method of any of embodiments 31-33: wherein the operationally-dependent list is generated using a probabilistic network; and wherein the probabilistic network receives as input the indication of the region of waking and generates an indication of a probability of waking for the at least one turbine.

Embodiment 35

The method of any of embodiments 31-34: wherein the indication of the region of waking comprises a wake rose.

Embodiment 36

The method of any of embodiments 31-35: wherein an apex of the indication of the region for waking of the wake rose is positioned on at least one upstream turbine; and
wherein one or more downstream turbines within the region are determined to be waked.

Embodiment 37

The method of any of embodiments 31-36: wherein the region comprises a triangle or a cone.

Embodiment 38

The method of any of embodiments 31-37: wherein one or both of a width or a length of the region is dependent on a wind speed.

Embodiment 39

The method of any of embodiments 31-38: wherein both of the width and the length of the region is dependent on the wind speed.

Embodiment 40

The method of any of embodiments 31-39: wherein a central axis for the region is the same or parallel to a current direction of the wind.

Embodiment 41

The method of any of embodiments 31-40: wherein the region of the wake rose is dependent on one or more of wind speed, wind direction, turbulence intensity, wind shear, or one or more aspects of an upstream turbine under consideration for causing waking.

Embodiment 42

The method of any of embodiments 31-41: wherein the region of the wake rose is dependent on each of wind speed, wind direction, turbulence intensity, wind shear, and one or more aspects of an upstream turbine under consideration for causing waking.

Embodiment 43

The method of any of embodiments 31-42: wherein a wind rose is input to a computational fluid dynamic (CFD) model in order for the CFD model to generate operationally-independent recommended control of at least one of the wind turbines in the wind farm; and
wherein the wake rose is input to a probabilistic network to generate an operational state of one or more of the wind turbines in the wind farm.

Embodiment 44

The method of any of embodiments 31-43: wherein automatically analyzing both of the operationally-independent list and the operationally-dependent list comprises:
automatically analyzing whether one or more upstream wind turbines cause wakes in one or more downstream wind turbines; and
responsive to determining that the one or more upstream wind turbines do not cause wakes or cause wakes below a predetermined amount, automatically preventing wake steering of the one or more upstream wind turbines.

Embodiment 45

The method of any of embodiments 31-44: wherein automatically selecting the one or more wind turbines for wake steering comprises automatically selecting, based on the analysis, the one or more wind turbines for wake steering from only one of the operationally-independent list or the operationally-dependent list, with the one or more wind turbines selected not being included in other of the operationally-independent list or the operationally-dependent list thereby rejecting the other of the operationally-independent list and the operationally-dependent list.

Embodiment 46

The method of any of embodiments 31-45: wherein automatically analyzing both of the operationally-independent list and the operationally-dependent list comprises determining whether there is at least one wind turbine that is common to both of the operationally-independent list and the operationally-dependent list; and
wherein, responsive to determining that there are no wind turbines common to both of the operationally-independent list and the operationally-dependent list:
automatically selecting at least one wind turbine on the operationally-dependent list for wake steering; and
automatically delaying maintenance on the at least one wind turbine so that the maintenance is performed after the wake steering.

Embodiment 47

The method of any of embodiments 31-46: wherein automatically analyzing both of the operationally-independent list and the operationally-dependent list comprises:
automatically determining whether there is at least one wind turbine that is common to both of the operationally-independent list and the operationally-dependent list;
responsive to determining that there are no wind turbines common to both of the operationally-independent list and the operationally-dependent list:
automatically analyzing the one or more wind turbines in the operationally-dependent list for the wake steering with regard to at least one efficiency metric; and
automatically selecting, based on the analysis with regard to the at least one efficiency metric, at least one of the one or more wind turbines in the operationally-dependent list for wake steering.

Embodiment 48

The method of any of embodiments 31-47: wherein the at least one efficiency metric comprises annual energy production (AEP); and wherein analyzing the one or more wind turbines in the operationally-dependent list for the wake steering with regard to at least one efficiency metric comprises using a computational fluid dynamic (CFD) model in simulation mode to simulate the AEP for wake steering of the one or more wind turbines.

Embodiment 49 a turbine management system comprising:
a communication interface configured to receive sensed information indicative of one or more aspects of wind; and
a wake steering system in communication with the communication interface, the wake steering system configured to:
automatically generate, using a computational fluid dynamic (CFD) model and based on the one or more aspects of the wind, operationally-independent recommended control of one or more wind turbines in a wind farm;
automatically generate, using a probabilistic network, an operational state of a plurality of the wind turbines in the wind farm;
automatically reconcile the operationally-independent recommended control and the operational state to generate operationally-dependent recommended control; and
control, using the operationally-dependent recommended control, the wind farm for wake steering.

Embodiment 50

The turbine management system of embodiment 49: wherein the wake steering system is configured to automatically reconcile the operationally-independent recommended control and the operational state to generate operationally-dependent recommended control by using a machine-learned (ML) model.

Embodiment 51

The turbine management system of embodiments 49 or 50: wherein the CFD model is configured to automatically output an operationally-independent list of one or more wind turbines to wake steer;
wherein the probabilistic network is configured to automatically generate an output indicative of an operationally-dependent list of one or more wind turbines to wake steer;
wherein the wake steering system is configured to automatically reconcile by automatically determining whether there are one or more common wind turbines in the operationally-independent list and the operationally-dependent list; and
responsive to determining that there are one or more common wind turbines in the operationally-independent list and the operationally-dependent list, the wake steering system is configured to control at least the one or more common wind turbines for wake steering.

Embodiment 52

The turbine management system of any of embodiments 49-51: wherein the operationally-independent list comprises an initial output of the CFD model;
wherein the operationally-dependent list is based on an initial output of the probabilistic network; and
wherein responsive to automatically determining that there are no common wind turbines in the operationally-independent list and the operationally-dependent list, the wake steering system is configured to automatically analyze the wind turbines in one or both of the operationally-independent list or the operationally-dependent list to select for wake steering thereby rejecting at least one of the initial output of the CFD model or the initial output of the probabilistic network.

Embodiment 53

The turbine management system of any of embodiments 49-52: wherein the wake steering system is configured to automatically analyze the wind turbines in one or both of the operationally-independent list or the operationally-dependent list to select for wake steering by:
automatically analyzing the wind turbines in the operationally-dependent list to select at least one wind turbine in the operationally-dependent list for wake steering with the at least one wind turbine selected not included in the operationally-independent list, thereby rejecting the initial output of the CFD model.

Embodiment 54

The turbine management system of any of embodiments 49-53: wherein the wake steering system is configured to automatically analyze the wind turbines in one or both of the operationally-independent list or the operationally-dependent list to select for wake steering by automatically analyzing at least one turbine in the operationally-independent list that is not on in the operationally-dependent list; and
wherein the wake steering system is configured to automatically reconcile by changing a maintenance schedule of the at least one turbine so that maintenance of the at least one turbine is performed after the wake steering.

Embodiment 55

The turbine management system of any of embodiments 49-54: wherein the wake steering system is configured to automatically reconcile the operationally-independent recommended control and the operational state to automatically generate operationally-dependent recommended control independently of one or more manufacturers of the wind turbines.

Embodiment 56

The turbine management system of any of embodiments 49-55: wherein the wake steering system is configured to automatically reconcile the operationally-independent recommended control and the operational state to automatically generate operationally-dependent recommended control independently of a location of the wind farm.

Embodiment 57

The turbine management system of any of embodiments 49-56: wherein the wake steering system is configured to automatically reconcile independently of whether an adjacent wind farm is creating wakes for the wind farm.

Embodiment 58

The turbine management system of any of embodiments 49-57: wherein the one or more aspects of the wind comprises wind speed and wind direction.

Embodiment 59 a turbine management system comprising:
a communication interface configured to receive sensed information indicative of one or more aspects of wind; and
a wake steering system in communication with the communication interface, the wake steering system configured to:
automatically generate, based on the one or more aspects of the wind, an operationally-independent list of one or more wind turbines to wake steer;
automatically generate an output indicative of an operationally-dependent list of one or more wind turbines to wake steer, the operationally-dependent list being dependent on determinations of one or more of being waked, underperforming, or being derated;
automatically analyze both of the operationally-independent list and the operationally-dependent list;
automatically select, based on the analysis, one or more wind turbines for wake steering; and
control the one or more wind turbines for wake steering.

Embodiment 60

The turbine management system of embodiment 59: wherein the operationally-dependent list is dependent on determinations for at least one turbine of each of being waked, going offline, underperforming, and being derated.

Embodiment 61

The turbine management system of embodiments 59 or 60: wherein the wake steering system is further configured to:
automatically generate an indication of a region of waking; and
automatically determine, based on the indication of the region of waking, whether the at least one turbine is being waked.

Embodiment 62

The turbine management system of any of embodiments 59-61: wherein the wake steering system is configured to automatically generate the operationally-dependent list using a probabilistic network; and
wherein the probabilistic network is configured to receive as input the indication of the region of waking and automatically generate an indication of a probability of waking for the at least one turbine.

Embodiment 63

The turbine management system of any of embodiments 59-62: wherein the indication of the region of waking comprises a wake rose.

Embodiment 64

The turbine management system of any of embodiments 59-63: wherein an apex of the indication of the region for waking of the wake rose is positioned on at least one upstream turbine; and
wherein the probabilistic network is configured to automatically determine that one or more downstream turbines within the region are waked.

Embodiment 65

The turbine management system of any of embodiments 59-64: wherein the region comprises a triangle or a cone.

Embodiment 66

The turbine management system of any of embodiments 59-65: wherein one or both of a width or a length of the region is dependent on a wind speed.

Embodiment 67

The turbine management system of any of embodiments 59-66: wherein both of the width and the length of the region is dependent on the wind speed.

Embodiment 68

The turbine management system of any of embodiments 59-67: wherein a central axis for the region is the same or parallel to a current direction of the wind.

Embodiment 69

The turbine management system of any of embodiments 59-68: wherein the region of the wake rose is dependent on one or more of wind speed, wind direction, turbulence intensity, wind shear, or one or more aspects of an upstream turbine under consideration for causing waking.

Embodiment 70

The turbine management system of any of embodiments 59-69: wherein the region of the wake rose is dependent on each of wind speed, wind direction, turbulence intensity, wind shear, and one or more aspects of an upstream turbine under consideration for causing waking.

Embodiment 71

The turbine management system of any of embodiments 59-70: wherein the wake steering system includes a computational fluid dynamic (CFD) model and a probabilistic network;
wherein the CFD model is configured to input a wind rose in order for the CFD model to generate operationally-independent recommended control of at least one of the wind turbines in a wind farm; and
wherein the probabilistic network is configured to input the wake rose to determine whether one or more of the wind turbines in the wind farm are being waked.

Embodiment 72

The turbine management system of any of embodiments 59-71: wherein the wake steering system is configured to automatically analyze both of the operationally-independent list and the operationally-dependent list by:
- automatically analyzing whether one or more upstream wind turbines cause wakes in one or more downstream wind turbines; and
- responsive to determining that the one or more upstream wind turbines do not cause wakes or cause wakes below a predetermined amount, automatically prevent wake steering of the one or more upstream wind turbines.

Embodiment 73

The turbine management system of any of embodiments 59-72: wherein the wake steering system is configured to automatically select the one or more wind turbines for wake steering by automatically selecting, based on the analysis, the one or more wind turbines for wake steering from only one of the operationally-independent list or the operationally-dependent list, with the one or more wind turbines selected not being included in the other of the operationally-independent list or the operationally-dependent list thereby rejecting the other of the operationally-independent list and the operationally-dependent list.

Embodiment 74

The turbine management system of any of embodiments 59-73: wherein the wake steering system is configured to automatically analyze both of the operationally-independent list and the operationally-dependent list by automatically determining whether there is at least one wind turbine that is common to both of the operationally-independent list and the operationally-dependent list; and
- wherein, responsive to automatically determining that there are no wind turbines common to both of the operationally-independent list and the operationally-dependent list, the wake steering system is configured to:
  - automatically select at least one wind turbine on the operationally-dependent list for wake steering; and
  - delay maintenance on the at least one wind turbine so that the maintenance is performed after the wake steering.

Embodiment 75

The turbine management system of any of embodiments 59-74: wherein the wake steering system is configured to automatically analyze both of the operationally-independent list and the operationally-dependent list by:
- automatically determining whether there is at least one wind turbine that is common to both of the operationally-independent list and the operationally-dependent list;
- responsive to automatically determining that there are no wind turbines common to both of the operationally-independent list and the operationally-dependent list:
  - automatically analyzing the one or more wind turbines in the operationally-dependent list for the wake steering with regard to at least one efficiency metric; and
  - automatically selecting, based on the analysis with regard to the at least one efficiency metric, at least one of the one or more wind turbines in the operationally-dependent list for wake steering.

Embodiment 76

The turbine management system of any of embodiments 59-75: wherein the at least one efficiency metric comprises annual energy production (AEP); and
- wherein the wake steering system is configured to automatically analyze the one or more wind turbines in the operationally-dependent list for the wake steering with regard to at least one efficiency metric by using a computational fluid dynamic (CFD) model in simulation mode to simulate the AEP for wake steering of the one or more wind turbines.

What is claimed is:

1. A computer-implemented method for wake steering of wind turbines in a wind farm, the method comprising:
   - automatically accessing one or more aspects of wind;
   - automatically generating, using at least one model that analyzes in combination both operational state and operational health due to controlled operation of one or more wind turbines in a wind farm, recommended yaw control for the one or more wind turbines in order to increase power generated by the one or more wind turbines; and
   - controlling, using the recommended yaw control, the wind farm for wake steering; and
   - wherein the at least one model generates the recommended yaw control for the one or more wind turbines by analyzing a plurality of factors that dynamically factors efficiency of power generated by the one or more wind turbines and the operational health due to the controlled operation of the one or more wind turbines.

2. The method of claim 1, wherein the plurality of factors comprise one or more factors of the one or more wind turbines independent of yaw steering and one or more factors of the one or more wind turbines dependent on the controlled operation of the yaw steering.

3. The method of claim 2, wherein the one or more factors, for a respective wind turbine, independent of the yaw steering comprise one or more of: being waked; being offline; under-performing; or being derated; and
   - wherein the one or more factors, for the respective wind turbine, dependent on the controlled operation of the yaw steering comprise one or more of: number of yaw steers performed for the respective wind turbine in a predetermined period; extent of yaw angle change for the respective wind turbine; or limit as to yaw angle change for the respective wind turbine.

4. The method of claim 2, wherein at least one factor of the plurality of factors is used to exclude one or more potential yaw steering permutations; and
   - wherein the at least one model is configured to analyze one or more remaining yaw steering permutations to dynamically balance the efficiency of power generated by the one or more wind turbines and the operational health due to the controlled operation of the one or more wind turbines.

5. The method of claim 4, wherein the at least one model analyzes the one or more remaining yaw steering permutations according to a multi-armed bandit problem.

6. The method of claim 2, wherein the one or more factors independent of the yaw steering comprises an indication of being waked; and wherein the indication of being waked comprises a wake rose.

7. The method of claim 6, wherein the wake rose comprises an indication of a region of waking;

wherein an apex of the indication of the region for waking of the wake rose is positioned on at least one upstream turbine of the one or more wind turbines; and wherein one or more downstream turbines of the one or more wind turbines within the region are determined to be waked.

8. The method of claim 2, wherein the one or more factors dependent on the controlled operation comprises a number of yaw steers in a predetermined time period for a respective wind turbine.

9. The method of claim 2, wherein the one or more factors dependent on the controlled operation comprises an amount of change in yaw angle for a respective wind turbine.

10. The method of claim 1, wherein the one or more aspects of the wind comprise one or both of wind speed or wind direction;

wherein the one or both of the wind speed or the wind direction are sensed from one or more meteorological (MET) towers;

wherein the one or both of the wind speed or the wind direction are modified based on potential waking; and wherein the modified one or both of the wind speed or the wind direction are used by the at least one model to generate the recommended yaw control.

11. The method of claim 1, wherein at least one of the operational state or the operational health for a respective turbine comprises whether the respective turbine is derated, waked, under maintenance, or underperforming.

12. The method of claim 1, wherein the at least one model dynamically factors the efficiency and the operational health by determining whether the one or more wind turbines are waked.

13. The method of claim 12, wherein, responsive to determining that a respective turbine of the one or more wind turbines is waked, the respective turbine is removed from consideration for the recommended yaw control.

14. The method of claim 12, wherein, responsive to determining that a respective turbine of the one or more wind turbines is waked, the respective turbine is still considered for the recommended yaw control.

15. A computer-implemented method of claim 1, for wake steering of wind turbines in a wind farm, the method comprising:

automatically accessing one or more aspects of wind;

automatically generating, using at least one model that analyzes in combination both operational state and operational health due to controlled operation of one or more wind turbines in a wind farm, recommended yaw control for the one or more wind turbines in order to increase power generated by the one or more wind turbines; and controlling, using the recommended yaw control, the wind farm for wake steering; and wherein the at least one model comprises:
a computational fluid dynamic (CFD) model used to generate, based on the one or more aspects of wind, operationally-independent recommended control of at least one of the wind turbines in the wind farm; and
a machine-learned (ML) model used to automatically reconcile the operationally-independent recommended control and one or both of the operational state or the operational health to generate operationally-dependent recommended control; and wherein the recommended yaw control comprises the operationally-dependent recommended control.

16. A computer-implemented method for wake steering of wind turbines in a wind farm, the method comprising:

automatically accessing one or more aspects of wind;

automatically generating, using at least one model that analyzes in combination both operational state and operational health due to controlled operation of one or more wind turbines in a wind farm, recommended yaw control, for the one or more wind turbines in order to increase power generated by the one or more wind turbines; and controlling, using the recommended yaw control, the wind farm for wake steering; and wherein a first computing device generates the recommended yaw control for the one or more wind turbines;

wherein a second computing device controls the wind farm for wake steering, the second computing device comprising an automation platform for sending commands to the one or more wind turbines to modify operation to the recommended yaw control;

wherein the first computing device includes or communicates with a virtual second computing device that virtually mirrors operations of the second computing device;

wherein the first computing device, prior to sending the recommended yaw control to the second computing device, sends the recommended yaw control to the virtual second computing device in order to simulate implementing the recommended yaw control; and wherein the first computing device, based on the simulation implementing the recommended yaw control, determines whether to send the recommended yaw control to the second computing device.

17. A computer-implemented method for wake steering of wind turbines in a wind farm, the method comprising:

automatically accessing one or more aspects of wind;

automatically generating, using at least one model that analyzes in combination both operational state and operational health due to controlled operation of one or more wind turbines in a wind farm, recommended yaw control for the one or more wind turbines in order to increase power generated by the one or more wind turbines; and controlling, using the recommended yaw control, the wind farm for wake steering; and wherein at least one computing device generates the recommended yaw control for the one or more wind turbines based on a machine-learned model;

wherein at least an operator computing device receives the recommended yaw control for the one or more wind turbines;

wherein an operator, at the at least an operator computing device, accepts or rejects the recommended yaw control for the one or more wind turbines;

wherein, responsive to the operator rejecting the recommended yaw control, the rejection and at least one operator reason for the rejecting of the recommended yaw control is logged in a logging device; and wherein the machine-learned model is further trained based on the rejection of the recommended yaw control and the at least one operator reason for the rejecting of the recommended yaw control.

18. A turbine management system comprising:
a communication interface; and
a wake steering system in communication with the communication interface, the wake steering system configured to:
automatically access one or more aspects of wind;

automatically generate, using at least one model configured to analyze in combination both operational state and operational health due to controlled operation of one or more wind turbines in a wind farm, recommended yaw control for the one or more wind turbines in order to increase power generated by the one or more wind turbines; and control, via the communication interface and using the recommended yaw control, the wind farm for wake steering; and wherein the at least one model is configured to generate the recommended yaw control for the one or more wind turbines by analyzing a plurality of factors that dynamically factors efficiency of power generated by the one or more wind turbines and the operational health due to the controlled operation of the one or more wind turbines.

19. The turbine management system of claim 18, wherein the at least one model is configured to dynamically factor the efficiency of power generated by the one or more wind turbines and the operational health due to the controlled operation of the one or more wind turbines based on both a current sensing of the one or more aspects of the wind and on a current state of the one or more wind turbines.

20. The turbine management system of claim 18, wherein the plurality of factors comprise one or more factors of the one or more wind turbines independent of yaw steering and one or more factors of the one or more wind turbines dependent on the controlled operation the yaw steering.

21. The turbine management system of claim 20, wherein the one or more factors, for a respective wind turbine, independent of the yaw steering comprise one or more of: being waked; being offline; under-performing; or being derated; and wherein the one or more factors, for the respective wind turbine, dependent on the controlled operation of the yaw steering comprise one or more of: number of yaw steers performed for the respective wind turbine in a predetermined period; extent of yaw angle change for the respective wind turbine; or limit as to yaw angle change for the respective wind turbine.

22. The turbine management system of claim 18, wherein the at least one model comprises at least one model configured to generate operationally independent turbine control and at least one model configured to reconcile the operationally independent turbine control with an operationally dependent state of the one or more wind turbines in order to generate operationally dependent control of the one or more wind turbines.

23. The turbine management system of claim 22, wherein the at least one model configured to generate operationally independent turbine control comprises at least one computational fluid dynamic model; and wherein the at least one model configured to reconcile the operationally independent turbine control with an operationally dependent state of the one or more wind turbines comprises a machine-learned model.

24. The turbine management system of claim 18, wherein at least one of the operational state or the operational health for a respective turbine comprises whether the respective turbine is derated, waked, under maintenance, or underperforming.

25. The turbine management system of claim 18, wherein the at least one model is configured to dynamically factor the efficiency and the operational health by determining whether the one or more wind turbines are waked.

26. A computer-implemented method for wake steering of wind turbines in a wind farm, the method comprising:

automatically accessing one or more aspects of wind;

automatically generating operationally-dependent recommended yaw control for one or more wind turbines in a wind farm in order to increase power generated by the one or more wind turbines by:

automatically generating operationally-independent recommended yaw control of at least one of the wind turbines in the wind farm; and automatically reconciling the operationally-independent recommended yaw control and one or both of operational state or operational health to generate the operationally-dependent recommended yaw control; and controlling, using the operationally-dependent recommended yaw control, the wind farm for wake steering;

wherein at least one model automatically generates the operationally-independent recommended yaw control and automatically reconciles the operationally-independent recommended yaw control and one or both of operational state or operational health to generate the operationally-dependent recommended yaw control; and wherein the at least one model comprises:

at least one computational fluid dynamic model that automatically generates the operationally-independent recommended yaw control; and a machine-learned model that automatically reconciles the operationally-independent recommended yaw control and one or both of operational state or operational health to generate the operationally-dependent recommended yaw control.

27. The method of claim 26, wherein the operationally-independent recommended yaw control and both of the operational state and the operational health are reconciled in order to generate the operationally-dependent recommended yaw control.

28. The method of claim 27, wherein the operational health is due to controlled operation of one or more wind turbines.

* * * * *